US011067592B2

(12) United States Patent
Hurst et al.

(10) Patent No.: US 11,067,592 B2
(45) Date of Patent: Jul. 20, 2021

(54) METHODS AND APPARATUS FOR PROGNOSTIC HEALTH MONITORING OF A TURBINE ENGINE

(71) Applicant: General Electric Company, Schenectady, NY (US)

(72) Inventors: William Edwin Hurst, Evendale, OH (US); Mei Gao, Evendale, OH (US); Vivek Gandhi, Bangalore (IN); Donald Horn, West Chester, OH (US); Gregory Jon Chiaramonte, West Chester, OH (US); Katherine Tharp Nowicki, Cincinnati, OH (US); Steven Richard Levin, West Chester, OH (US); Michael William Bailey, Evendale, OH (US); Ronald Plybon, Cincinnati, OH (US); Mustafa Tekin Dokucu, Latham, NY (US); Aditya Kumar, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 497 days.

(21) Appl. No.: 15/809,747

(22) Filed: Nov. 10, 2017

(65) Prior Publication Data

US 2019/0146000 A1 May 16, 2019

(51) Int. Cl.
*G01P 5/14* (2006.01)
*G01P 21/02* (2006.01)
(Continued)

(52) U.S. Cl.
CPC ............... *G01P 5/14* (2013.01); *G01P 13/02* (2013.01); *G01P 21/02* (2013.01);
(Continued)

(58) Field of Classification Search
CPC . G01F 1/34; G01P 13/02; G01P 21/02; G01P 5/14; G05B 23/0254; G05B 23/0289
See application file for complete search history.

(56) References Cited

U.S. PATENT DOCUMENTS 6,067,486 A 5/2000 Aragones et al.
6,732,040 B2 5/2004 Sangeeta et al.
(Continued)

OTHER PUBLICATIONS

Donaldson et al., "Economic Impact of Derated Climb on Large Commercial Engines", 2007 Performance and Flight Operations Engineering Conference, 14 pages.
(Continued)

*Primary Examiner* — Kyle R Quigley
(74) *Attorney, Agent, or Firm* — Wood IP LLC

(57) ABSTRACT

Methods, apparatus, systems, and articles of manufacture are disclosed to perform prognostic health monitoring of a turbine engine. An example apparatus includes a health quantifier calculator to execute a computer-generated model to generate first sensor data of a turbine engine, the first sensor data based on simulating a sensor monitoring the turbine engine using asset monitoring information, a parameter tracker to execute a tracking filter using the first sensor data and second sensor data to generate third sensor data corresponding to the turbine engine, the second sensor data based on obtaining sensor data from a sensor monitoring the turbine engine, the third sensor data based on comparing the first sensor data to the second sensor data, the health quantifier calculator to execute the computer-generated model using the third sensor data to generate an asset health quantifier of the turbine engine; and a report generator to generate a report including the asset health quantifier and a workscope recommendation based on the asset health quantifier when the asset health quantifier satisfies a threshold.

15 Claims, 11 Drawing Sheets

(51) Int. Cl.
  *G01P 13/02* (2006.01)
  *G05B 23/02* (2006.01)
  *G01F 1/34* (2006.01)

(52) U.S. Cl.
  CPC ..... *G05B 23/0254* (2013.01); *G05B 23/0289* (2013.01); *G01F 1/34* (2013.01)

(56) References Cited

U.S. PATENT DOCUMENTS

| | | |
|---|---|---|
| 6,832,205 B1 | 12/2004 | Aragones et al. |
| 6,871,160 B2 | 3/2005 | Jaw |
| 8,868,287 B2 | 10/2014 | Delaye et al. |
| 9,477,224 B2 | 10/2016 | Khan et al. |
| 2006/0010152 A1 | 1/2006 | Catalano et al. |
| 2006/0217870 A1* | 9/2006 | Hoff ................ G05B 23/0254 701/100 |
| 2008/0101683 A1* | 5/2008 | Zombo ................ F01D 21/003 382/141 |
| 2008/0172268 A1 | 7/2008 | Wingenter |
| 2009/0048730 A1 | 2/2009 | Akkaram et al. |
| 2010/0262442 A1 | 10/2010 | Wingenter |
| 2012/0166249 A1 | 6/2012 | Jackson |
| 2013/0110587 A1 | 5/2013 | Nowicki et al. |
| 2013/0179388 A1* | 7/2013 | Agarwal ................ G06Q 10/06 706/47 |

OTHER PUBLICATIONS

James et al., "Derated Climb Performance in Large Civil Aircraft", 2005 Performance and Flight Operations Engineering Conference, 14 Pages.

\* cited by examiner

METHODS AND APPARATUS FOR PROGNOSTIC HEALTH MONITORING OF A TURBINE ENGINE

FIELD OF THE DISCLOSURE

This disclosure relates generally to turbine engines and, more particularly, to methods and apparatus for prognostic health monitoring of a turbine engine.

BACKGROUND

In recent years, turbine engines have been increasingly utilized in a variety of applications and fields. Turbine engines are intricate machines with extensive availability, reliability, and serviceability requirements. Traditionally, maintaining turbine engines incur steep costs. Costs generally include having exceptionally skilled and trained maintenance personnel service the turbine engines. In some instances, costs are driven by replacing expensive components or by repairing complex sub-assemblies.

The pursuit of increasing turbine engine availability while reducing premature maintenance costs requires enhanced insight. Such insight is needed to determine when to perform typical maintenance tasks at generally appropriate service intervals. Traditionally, availability, reliability, and serviceability increase as enhanced insight is deployed.

The market for long-term contractual agreements has grown at high rates over recent years for many service organizations. As the service organizations establish long-term contractual agreements with their customers, it becomes important to understand the expected scope of work (also referred to as "workscope") including product, service, and/or other project result. In addition, the service organizations need to have an understanding of the planning of repairs (e.g., shop workload and/or workscope planning) and how the maintenance of components will affect management of their service contracts including time, cost, risk, etc.

BRIEF DESCRIPTION OF THE DRAWINGS

The figures are not to scale. Wherever possible, the same reference numbers will be used throughout the drawing(s) and accompanying written description to refer to the same or like parts.

BRIEF SUMMARY

Figure 1:
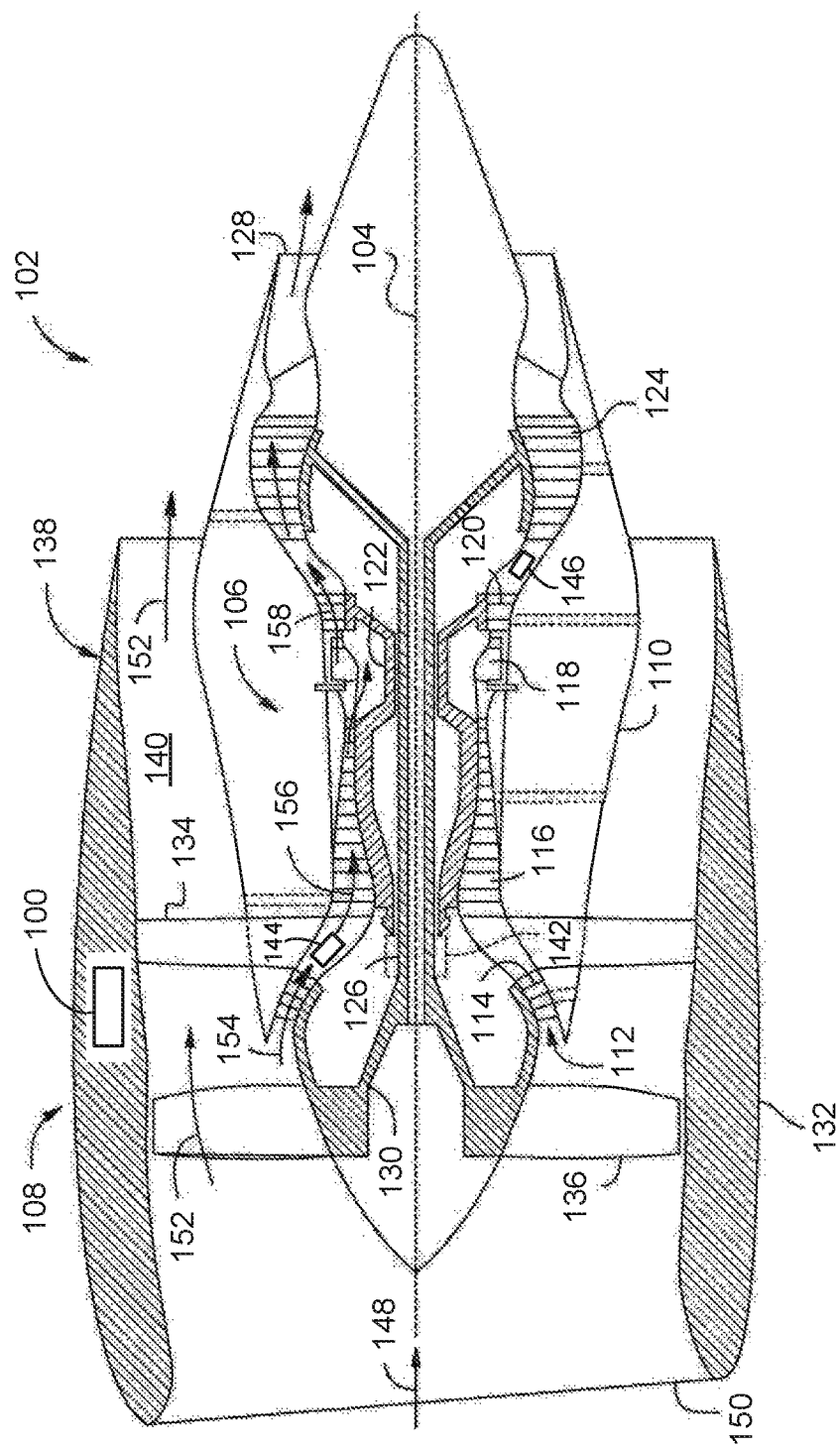
FIG. 1 illustrates an example gas turbine engine that can be utilized within an aircraft in which the examples disclosed herein can be implemented.

Methods, apparatus, systems, and articles of manufacture for prognostic health monitoring of a turbine engine are disclosed.

Certain examples provide an example apparatus for prognostic health monitoring of a turbine engine. The example apparatus includes a health quantifier calculator to execute a computer-generated model to generate first sensor data of a turbine engine, the first sensor data based on simulating a sensor monitoring the turbine engine using asset monitoring information, a parameter tracker to execute a tracking filter using the first sensor data and second sensor data to generate third sensor data corresponding to the turbine engine, the second sensor data based on obtaining sensor data from a sensor monitoring the turbine engine, the third sensor data based on comparing the first sensor data to the second sensor data, the health quantifier calculator to execute the computer-generated model using the third sensor data to generate an asset health quantifier of the turbine engine, and a report generator to generate a report including the asset health quantifier and a workscope recommendation based on the asset health quantifier when the asset health quantifier satisfies a threshold.

Certain examples provide an example method for prognostic health monitoring of an asset. The example method includes executing a computer-generated model to generate first sensor data of an asset, the first sensor data based on simulating a sensor monitoring the asset using asset monitoring information, executing a tracking filter using the first sensor data and second sensor data to generate third sensor data corresponding to the asset, the second sensor data based on obtaining sensor data from a sensor monitoring the asset, the third sensor data based on comparing the first sensor data to the second sensor data, executing the computer-generated model using the third sensor data to generate an asset health quantifier of the asset, and in response to the asset health quantifier satisfying a threshold, generating a report including the asset health quantifier and a workscope recommendation based on the asset health quantifier.

Certain examples provide an example non-transitory computer readable storage medium including instructions that, when executed, cause a machine to at least perform prognostic health monitoring of an asset. The example instructions, when executed, cause the machine to at least execute a computer-generated model to generate first sensor data of an asset, the first sensor data based on simulating a sensor monitoring the asset using asset monitoring information, execute a tracking filter using the first sensor data and second sensor data to generate third sensor data corresponding to the asset, the second sensor data based on obtaining sensor data from a sensor monitoring the asset, the third sensor data based on comparing the first sensor data to the second sensor data, execute the computer-generated model using the third sensor data to generate an asset health quantifier of the asset, and generate a report including the asset health quantifier and a workscope recommendation based on the asset health quantifier when the asset health quantifier satisfies a threshold.

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an exemplary implementation and not to be taken limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As used herein, the terms "system," "unit," "module,", "engine,", "component," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, or system may include a hard-wires device that performs operations based on hard-wired logic of the device. Various modules, units, engines, and/or systems shown in the attached figures may represent the hardware that operates based on software or hardwired instructions, the software that directs hardware to perform the operations, or a combination thereof.

A turbine engine, also called a combustion turbine or a gas turbine, is a type of internal combustion engine. Turbine engines are commonly utilized in aircraft and power-generation applications. As used herein, the terms "asset," "aircraft turbine engine," "gas turbine," "land-based turbine engine," and "turbine engine" are used interchangeably. A basic operation of the turbine engine includes an intake of fresh atmospheric air flow through the front of the turbine engine with a fan. In some examples, the air flow travels through an intermediate-pressure compressor or a booster compressor located between the fan and a high-pressure compressor. The booster compressor is used to supercharge or boost the pressure of the air flow prior to the air flow entering the high-pressure compressor. The air flow can then travel through the high-pressure compressor that further pressurizes the air flow. The high-pressure compressor includes a group of blades attached to a shaft. The blades spin at high speed and subsequently compress the air flow. The high-pressure compressor then feeds the pressurized air flow to a combustion chamber. In some examples, the high-pressure compressor feeds the pressurized air flow at speeds of hundreds of miles per hour. In some instances, the combustion chamber includes one or more rings of fuel injectors that inject a steady stream of fuel into the combustion chamber, where the fuel mixes with the pressurized air flow.

In the combustion chamber of the turbine engine, the fuel is ignited with an electric spark provided by an igniter, where the fuel in some examples burns at temperatures of more than 2000 degrees Fahrenheit. The resulting combustion produces a high-temperature, high-pressure gas stream (e.g., hot combustion gas) that passes through another group of blades called a turbine. A turbine includes an intricate array of alternating rotating and stationary airfoil-section blades. As the hot combustion gas passes through the turbine, the hot combustion gas expands, causing the rotating blades to spin. The rotating blades serve at least two purposes. A first purpose of the rotating blades is to drive the booster compressor and/or the high-pressure compressor to draw more pressured air into the combustion chamber. For example, the turbine is attached to the same shaft as the high-pressure compressor in a direct-drive configuration, thus, the spinning of the turbine causes the high-pressure compressor to spin. A second purpose of the rotating blades is to spin a generator operatively coupled to the turbine section to produce electricity. For example, the turbine can generate electricity to be used by an aircraft, a power station, etc.

In the example of an aircraft turbine engine, after passing through the turbine, the hot combustion gas exits the aircraft turbine engine through a nozzle at the back of the aircraft turbine engine. As the hot combustion gas exits the nozzle, the aircraft turbine engine and the corresponding aircraft coupled to the aircraft turbine engine are accelerated forward (e.g., thrusted forward). In the example of a land-based turbine engine, after passing through the turbine, the hot combustion gas is dissipated, used to generate steam, etc.

A turbine engine (e.g., an aircraft turbine engine) typically includes components (e.g., asset components, etc.) or modules (e.g., asset modules or assemblies including one or more components, etc.) for operation such as a fan (e.g., a fan section), a booster compressor, a high-pressure compressor, a high-pressure turbine, and a low-pressure turbine. The components can degrade over time due to demanding operating conditions such as extreme temperature and vibration. In some instances, debris or other objects enter the turbine engine via the fan and cause damage to one or more components. Routine maintenance intervals and service checks can be implemented to inspect for degradation and/or damage. However, in some instances, taking the turbine engine offline or off wing to perform maintenance includes taking an entire system, such as an aircraft, offline. In addition to prematurely replacing expensive components, aircraft non-operation can incur additional costs such as lost revenue, labor costs, etc. Monitoring components for degradation can provide actionable information for maintenance personnel to replace a component of the turbine engine when necessary, to optimally schedule maintenance tasks of the turbine engine based on contractual and/or maintenance resources, etc.

Examples disclosed herein include an example asset workscope generation system (AWGS) to combine field data, statistical analytic tools, engineering physics-based models, prediction simulators integrated with forecasted mission requirements, etc., to develop a recommended modular workscope and a timing to perform the recommended modular workscope for an asset such as a turbine engine to satisfy customer contractual and field personnel expectations. As used herein, the term "workscope" refers to a set of tasks (e.g., one or more maintenance tasks, service tasks, etc.) executed by maintenance personnel to improve an operating condition of an asset, where the operating condition is determined based on requirements such as contractual requirements, environmental requirements, regulatory requirements, utilization requirements, etc., and/or a combination thereof. In some examples, the AWGS obtains asset monitoring information from one or more assets, a network, a server, etc. As used herein, the term asset monitoring information refers to information corresponding to one or more assets such as asset sensor information, asset environmental information, asset utilization information, asset configuration information, asset history information, asset class history information, asset workscope quantifiers, etc.

In some examples, the AWGS identifies target assets for removal from service (e.g., removal from an aircraft, removal from a facility, removal from use, etc.) based on calculating an asset health quantifier. As used herein, the term "asset health quantifier" refers to a numerical representation corresponding to a health status, an operational status, etc., of an asset, an asset component, etc. For example, the asset health quantifier can be represented by a percentage of useful life remaining, a number of flight cycles (e.g., a number of flight cycles to be executed before service is performed, etc.), a quantity of time-on-wing (TOW) hours (e.g., a number of time-on-wing hours before service is performed, etc.), etc. For example, an asset health quantifier of 75% for a turbine engine booster compressor can correspond to the booster compressor having 75% of useful life remaining before the booster compressor may become non-responsive or requires a maintenance action. In another example, an asset health quantifier of 500 cycles for a turbine engine fan section can correspond to the turbine engine fan section executing 500 cycles before the fan section can be serviced to satisfy a contractual requirement.

In some examples, the AWGS can execute one or more engineering physics-based models, historical information-based models, statistical models, etc., and/or a combination thereof to generate an actual asset health quantifier for an asset, an asset component, an asset module, etc. In some examples, the AWGS can generate a projected asset health quantifier based on forecasted mission requirements of the asset (e.g., forecasted contractual requirements, forecasted environmental information, etc.).

In some examples, the AWGS can identify one or more target assets for removal based on comparing one or more asset health quantifiers (e.g., an actual asset health quantifier, a projected asset health quantifier, etc.) to a threshold, determine whether the one or more asset health quantifiers satisfy the threshold, and identify the one or more target assets for removal based on the comparison.

In some examples, the AWGS generates a workscope task for the target asset. For example, the AWGS can identify a set of tasks (e.g., maintenance tasks, service tasks, etc.) to perform maintenance on a fan section (e.g., one or more fan blades, etc.) of a turbine engine. For example, the AWGS can identify maintenance costs corresponding to each task in the set of tasks. For example, the AWGS can calculate a cost based on a quantity of maintenance personnel and corresponding man-hours to perform a maintenance task, a quantity of components (e.g., a quantity of replacement parts, spare parts, shop-supplied parts, etc., and/or a combination thereof) to perform the maintenance task, a monetary cost for each of the components, etc.

In some examples, the AWGS optimizes and/or otherwise improves a workscope based on the generated workscope tasks for the target asset. For example, the AWGS can generate a plurality of workscopes in which each workscope includes a combination of one or more of the generated workscope tasks. The example AWGS can calculate an estimate asset health quantifier for the target asset based on estimating what the asset health quantifier for the target asset can be in response to performing a specified workscope on the target asset. The example AWGS can calculate an estimate asset health quantifier for each one of the generated workscopes. The example AWGS can identify a workscope for the target asset based on one or more factors such as comparing the calculated estimate asset health quantifiers to contractual requirements, customer requirements, operational constraints, etc., and/or a combination thereof.

In some examples, the AWGS calculates a workscope quantifier based on comparing a first asset health quantifier for a target asset to a second asset health quantifier for the target asset. For example, the first asset health quantifier can be an asset health quantifier (e.g., an actual asset health quantifier, a projected asset health quantifier, etc.) of the target asset prior to completing a workscope on the target asset. The second asset health quantifier can be an asset health quantifier (e.g., an actual asset health quantifier, a projected asset health quantifier, etc.) of the target asset after completing the workscope on the target asset. For example, the AWGS can calculate a workscope quantifier by calculating a difference between the first and the second asset health quantifiers.

In some examples, the AWGS can compare the workscope quantifier to a workscope quantifier threshold and determine whether the workscope quantifier threshold has been satisfied based on the comparison. In some examples, the AWGS can modify one or more components of the AWGS in response to the workscope quantifier threshold being satisfied. For example, the AWGS can update one or more models, one or more parameters corresponding to a maintenance task, improve an optimization parameter for evaluating generated workscopes, etc., and/or a combination thereof in response to the workscope quantifier threshold being satisfied. While example assets described herein have been illustrated in terms of engines, such as a turbine engine, diesel engine, etc., the systems and methods disclosed and described herein can also apply to assets such as wind turbines, additive printing machines, locomotive engines, health imaging equipment such as computed tomography scanners, etc., or any other type of mechanical, electrical, or electro-mechanical device. Additionally or alternatively, the systems and methods disclosed and described herein can also apply to any asset that has modular elements that require maintenance planning and scheduling a removal within requirement constraints such as contractual constraints corresponding to a management of spare assets.

Examples disclosed herein include a fielded asset health advisor (FAHA) apparatus to calculate and analyze an asset health quantifier of an asset and corresponding asset components prior to performing a maintenance operation on the asset. For example, the FAHA can calculate and analyze the asset health quantifier of an asset and corresponding asset components while the asset is fielded (e.g., while on-wing of an aircraft, while in operation, etc.). For example, a fielded asset can refer to an asset performing an operation, an asset in operation generating revenue, or can refer to an asset in service consuming a portion of useful life of the asset in typical operation rather than in test, development, demonstration, maintenance, or other special use activity of the asset. Additionally or alternatively, the example FAHA can calculate and analyze the asset health quantifier after performing the maintenance operation on the asset to determine a quantity of asset health recovered in response to performing the maintenance operation (e.g., the workscope, etc.).

In some examples, the FAHA apparatus is a software application provided by an asset maintenance provider to an asset operator (e.g., an airline company, a manufacturing facility, etc.). For example, the FAHA apparatus can be a web-based application accessible via a computing device such as a personal computer (e.g., a desktop computer, a laptop computer, etc.), an Internet-enabled mobile handset (e.g., a smartphone, an Apple® iPod®, etc.), a tablet computer (e.g., an Apple® iPad®, a Microsoft® SURFACE™, etc.), etc. In another example, the FAHA apparatus can be a smartphone application (e.g., an Apple® iOS application, an ANDROID™ application, etc.), a tablet computer application (e.g., an Apple® iOS application for an Apple® iPad®, a Microsoft® Windows® application for a Microsoft® Surface™, etc.). Alternatively, the example FAHA apparatus can be any other type of software-based application executing on any type of computing device.

In some examples, the FAHA apparatus calculates and analyzes asset health quantifiers of the asset while the asset is in operation (e.g., while on-wing of an aircraft, while an asset is fielded, etc.). In some examples, the FAHA apparatus calculates and analyzes asset health quantifiers of the asset after the asset has been removed from operation but prior to performing an inspection (e.g., a maintenance inspection, a service inspection, etc.) of the asset. The example FAHA apparatus calculates and analyzes the asset health quantifiers based on obtaining sensor data (e.g., real-time sensor data, real-time operational data, etc.), executing one or more computer-based models to generate simulated asset sensor data, calibrating the simulated asset sensor data using a tracking filter, generating the asset health quantifiers (e.g., the actual asset health quantifiers, the projected asset health quantifiers, etc.) based on the calibrated simulated asset sensor data, and generating a report including the asset health quantifiers and workscope recommendations for the asset based on the asset health quantifiers.

In some examples, the FAHA apparatus obtains asset monitoring information. For example, the FAHA apparatus can obtain asset sensor information, asset environmental information, asset utilization information, etc., and/or a combination thereof. For example, the FAHA apparatus can obtain asset sensor information corresponding to a fielded asset while in operation (e.g., while on-wing of an aircraft, while an asset is fielded, etc.) or removed from operation but prior to an inspection (e.g., the asset is removed from the aircraft but prior to a performance of an inspection of the asset, etc.). In some examples, the FAHA apparatus determines a flight segment of the selected asset. For example, the FAHA apparatus can determine that the asset is coupled to an aircraft when the aircraft is parked, taxiing, taking off, climbing, cruising, descending, approaching, landing, etc.

In some examples, the FAHA apparatus executes one or more models such as an engineering physics-based model, a statistical model, etc., to generate an asset parameter for an asset, an asset component, an asset module, etc. For example, the asset parameter can be a value measured by a sensor monitoring one or more components of the asset. For example, the asset parameter can be a sensor value such as a turbine engine speed, a pressure, a pressure ratio, a temperature, a flow rate, etc. In another example, the asset parameter can be a value corresponding to cooling flows, bleeds, pressure losses, clearance or nozzle area changes, etc., of the asset. In yet another example, the asset parameter can be a sensor value corresponding to an aircraft to which the asset is coupled. For example, the asset parameter can be an altitude, a Mach number, etc., of the aircraft.

In some examples, the one or more models calculates an asset characteristic parameter such as an efficiency modifier (e.g., an efficiency adder, etc.), a flow modifier (e.g., a flow scalar, etc.). As used herein, the terms "efficiency modifier" and "efficiency adder" are used interchangeably and refer to a characteristic parameter used to determine an actual efficiency (e.g., an actual turbine engine efficiency) of a turbine engine based on a baseline (nominal) efficiency for the turbine engine. As used herein, the terms "flow modifier" and "flow scalar" are used interchangeably and refer to a characteristic parameter used to determine an actual flow rate based on a baseline (nominal) flow rate, where the flow rate refers to air flow or gas flow through a turbine engine.

In some examples, the FAHA apparatus generates the asset parameters by using steady-state asset data, transient asset data, etc., and/or a combination thereof. For example, the FAHA apparatus can execute one or more models such as an engineering physics-based model, a statistical model, etc., to generate a steady-state asset parameter for an asset, an asset component, an asset module, etc., using steady-state asset data. For example, the FAHA apparatus can generate a steady-state asset parameter of the asset during a cruising flight segment of the aircraft. In another example, the FAHA apparatus can execute one or more models such as an engineering physics-based model, a statistical model, etc., to generate a transient asset parameter for an asset, an asset component, an asset module, etc., using transient asset data. For example, the FAHA apparatus can generate a transient asset parameter of the asset during a transition period between a climbing flight segment and a cruising flight segment of the aircraft. In another example, the FAHA apparatus can generate a transient asset parameter of the asset during a transient flight segment such as a takeoff and departure flight segment.

In some examples, the FAHA apparatus selects tracking filter data to be used by a tracking filter based on the steady-state asset parameters and the transient asset parameters. For example, the tracking filter data can include steady-state asset parameters, transient asset parameters, etc. For example, the FAHA apparatus can merge steady-state operation points with snapshots, snippets, etc., of transient operation periods compared to using a long window of transient operation data. In some examples, the FAHA apparatus obtains the steady-state asset data and/or the transient asset data from the one or more models. In some examples, the FAHA apparatus obtains the steady-state asset data and/or the transient asset data from a database, from a server communicatively coupled to a network, etc.

In some examples, the FAHA apparatus utilizes a model that implements a tracking filter. The example FAHA apparatus can utilize the tracking filter to estimate an effect of component deterioration, sensor biases, turbine engine-to-turbine engine variations, etc., using the tracking filter data. In some examples, the tracking filter is a classical observer, an inverse Jacobian tracking filter, a least-squares tracking filter, a Kalman Filter (optimal observer), etc. The example FAHA apparatus can utilize the model and sensor outputs to obtain, track, and analyze sensor data and sensor data trends over time to determine differences between (1) model outputs, sensor outputs, etc., obtained and/or calculated during a calibration (e.g., an initial) process, and (2) model outputs, sensor outputs, etc., obtained and/or calculated during an operational process.

In some examples, the tracking filter is a parameter identification algorithm that tunes one or more parameters (e.g., steady-state asset parameters, transient asset parameters, etc.) in the model (e.g., the engineering-physics based model, the statistical model, etc.) to adjust model outputs to match sensor outputs. For example, the FAHA apparatus can obtain sensor data (e.g., an analog signal such as a current, a resistance, or a voltage) from a turbine engine sensor. For example, the turbine engine sensor can measure a speed of a rotor, a pressure, a temperature, etc. The example FAHA apparatus can convert or scale the sensor data to yield a sensor output in engineering units such as rpm, psi, or degrees Rankine. The example FAHA apparatus can calculate a model output (e.g., an output from the engineering-physics based model, the statistical model, etc.), where the model output is an estimate value for the sensor output based on a set of operating conditions or parameters of the turbine engine in the model. The example FAHA apparatus can compare the model output to the sensor output to determine a difference. The example FAHA apparatus can adjust simulated asset sensor data (e.g., simulated steady-state asset sensor data, simulated transient asset sensor data, etc.) of the model to eliminate and/or otherwise minimize the difference. For example, the FAHA apparatus can utilize the tracking filter to calibrate simulated asset sensor data to generate one or more asset health quantifiers.

In some examples, the FAHA apparatus executes one or more models such as an engineering physics-based model, a statistical model, etc., to generate an asset health quantifier for an asset, an asset component, an asset module, etc., based on the calibrated asset sensor data. In some examples, the asset health calculator apparatus generates a projected asset health quantifier based on forecasted mission requirements of the asset such as forecasted environmental information, forecasted utilization information, etc. In some examples, the FAHA aggregates and ranks the asset health quantifiers, the projected asset health quantifiers, etc. For example, the FAHA apparatus can rank assets or components of the assets based on the generated asset health quantifiers. In some examples, the FAHA apparatus compares an asset health quantifier to a threshold (e.g., an asset health quantifier threshold, a maintenance quantifier threshold, etc.) and determines whether the asset health quantifier satisfies the threshold based on the comparison.

In some examples, the FAHA apparatus generates a report based on the calibrated simulated asset sensor data, the asset health quantifiers, etc. For example, the FAHA apparatus can generate a report including the calibrated asset sensor data, the asset health quantifiers, etc., of the asset. In another example, the FAHA apparatus can generate a report including an identification of one or more assets as candidates for removal from service. In another example, the FAHA apparatus can generate a report including an identification of one or more asset components as candidates for refurbishment, maintenance, replacement, etc. In yet another example, the FAHA apparatus can generate a report including diagnostic support for asset management (e.g., fleet management, etc.), overhaul shops, maintenance facilities, etc., to help make more optimized and/or otherwise more improved targeted workscope plans, reduce shop turn-around time (TAT), and reduce cost (e.g., monetary cost, resource cost, etc.).

FIG. 1 is a schematic illustration of an example turbine engine controller 100 monitoring an example gas turbine engine 102. In the illustrated example, the turbine engine controller 100 is a full-authority digital engine control (FADEC) unit. For example, the turbine engine controller 100 can include a closed loop control module to generate a control input (e.g., a thrust command, a de-rate parameter, etc.) to the engine 102 based on an engine input (e.g., a pilot command, an aircraft control system command, etc.). Alternatively, the turbine engine controller 100 may be any other type of data acquisition and/or control computing device. FIG. 1 illustrates a cross-sectional view of the engine 102 that can be utilized within an aircraft in accordance with aspects of the disclosed examples. The gas turbine engine 102 is shown having a longitudinal or axial centerline axis 104 extending throughout the gas turbine engine 102 for reference purposes. In general, the engine 102 can include a core gas turbine engine 106 and a fan section 108 positioned upstream thereof. The core gas turbine engine 106 can generally include a substantially tubular outer casing 110 that defines an annular inlet 112. In addition, the outer casing 110 can further enclose and support a booster compressor 114 for increasing the pressure of the air that enters the core gas turbine engine 106 to a first pressure level. A high-pressure, multi-stage, axial-flow compressor 116 can then receive the pressurized air from the booster compressor 114 and further increase the pressure of such air to a second pressure level. Alternatively, the high-pressure, multi-stage compressor 116 can be a high-pressure, multi-stage centrifugal compressor or a high-pressure, multi-stage axial-centrifugal compressor.

In the illustrated example of FIG. 1, the pressurized air exiting the high-pressure compressor 116 can then flow to a combustor 118 within which fuel is injected into the flow of pressurized air, with the resulting mixture being combusted within the combustor 118. The high-energy combustion products are directed from the combustor 118 along the hot gas path of the engine 102 to a first (high-pressure) turbine 120 for driving the high-pressure compressor 116 via a first (high-pressure) drive shaft 122, and then to a second (low-pressure) turbine 124 for driving the booster compressor 114 and fan section 108 via a second (low-pressure) drive shaft 126 that is generally coaxial with first drive shaft 122. After driving each of the turbines 120 and 124, the combustion products can be expelled from the core gas turbine engine 106 via an exhaust nozzle 128 to provide propulsive jet thrust.

In some examples, each of the compressors 114, 116 can include a plurality of compressor stages, with each stage including both an annular array of stationary compressor vanes and an annular array of rotating compressor blades positioned immediately downstream of the compressor vanes. Similarly, each of the turbines 120, 124 can include a plurality of turbine stages, with each stage including both an annular array of stationary nozzle vanes and an annular array of rotating turbine blades positioned immediately downstream of the nozzle vanes.

Additionally, as shown in FIG. 1, the fan section 108 of the engine 102 can generally include a rotatable, axial-flow fan rotor assembly 130 that is configured to be surrounded by an annular fan casing 132. The fan casing 132 can be configured to be supported relative to the core gas turbine engine 106 by a plurality of substantially radially-extending, circumferentially-spaced outlet guide vanes 134. As such, the fan casing 132 can enclose the fan rotor assembly 130 and its corresponding fan rotor blades 136. Moreover, a downstream section 138 of the fan casing 132 can extend over an outer portion of the core gas turbine engine 106 to define a secondary, or by-pass, airflow conduit 140 that provides additional propulsive jet thrust.

In some examples, the second (low-pressure) drive shaft 126 is directly coupled to the fan rotor assembly 130 to provide a direct-drive configuration. Alternatively, the second drive shaft 126 can be coupled to the fan rotor assembly 130 via a speed reduction device 142 (e.g., a reduction gear or gearbox) to provide an indirect-drive or geared drive configuration. Such a speed reduction device(s) can also be provided between any other suitable shafts and/or spools within the engine 102 as desired or required.

In the illustrated example of FIG. 1, the engine 102 includes sensors 144, 146 communicatively coupled to the turbine engine controller 100. Alternatively, the sensors 144, 146 can be communicatively coupled to a control system of an aircraft coupled to the engine 102, in which the control system is communicatively coupled to the example turbine engine controller 100. In the illustrated example, the sensors 144, 146 are gas-path temperature sensors (e.g., exhaust gas-path temperature sensors, etc.). For example, the sensors 144, 146 can be monitoring a compressor inlet temperature and a temperature of gas exiting the high-pressure turbine 120. Alternatively, the sensors 144, 146 can be chip detector sensors (e.g., magnetic chip detector sensors, etc.), dust sensors, flow sensors, gas-path pressure sensors, rotor speed sensors, vibration sensors, position sensors (e.g., actuator position sensors, sensors detailing variable geometry, etc.), etc. Although the sensors 144, 146 are depicted in FIG. 1 as being at specific locations, the sensors 144, 146 can be located elsewhere on the engine 102. Additionally or alternatively, there can be more than two sensors 144, 146 located on the engine 102. A typical implementation has six gas-path temperature sensors 144, 146. Additionally or alternatively, there can be more than one example turbine engine controller 100 coupled to the engine 102. Although the example turbine engine controller 100 is depicted in FIG. 1 as being proximate the fan section 108, the turbine engine controller 100 can be located elsewhere on the engine 102 or elsewhere on the aircraft coupled to the engine 102.

During operation of the engine 102, an initial air flow (indicated by arrow 148) can enter the engine 102 through an associated inlet 150 of the fan casing 132. The air flow 148 then passes through the fan blades 136 and splits into a first compressed air flow (indicated by arrow 152) that moves through conduit 140 and a second compressed air flow (indicated by arrow 154) which enters the booster compressor 114. The pressure of the second compressed air flow 154 is then increased and enters the high-pressure compressor 116 (as indicated by arrow 156). After mixing with fuel and being combusted within the combustor 118, the combustion products 158 exit the combustor 118 and flow through the first turbine 120. Thereafter, the combustion products 158 flow through the second turbine 124 and exit the exhaust nozzle 128 to provide thrust for the engine 102.

Figure 2:
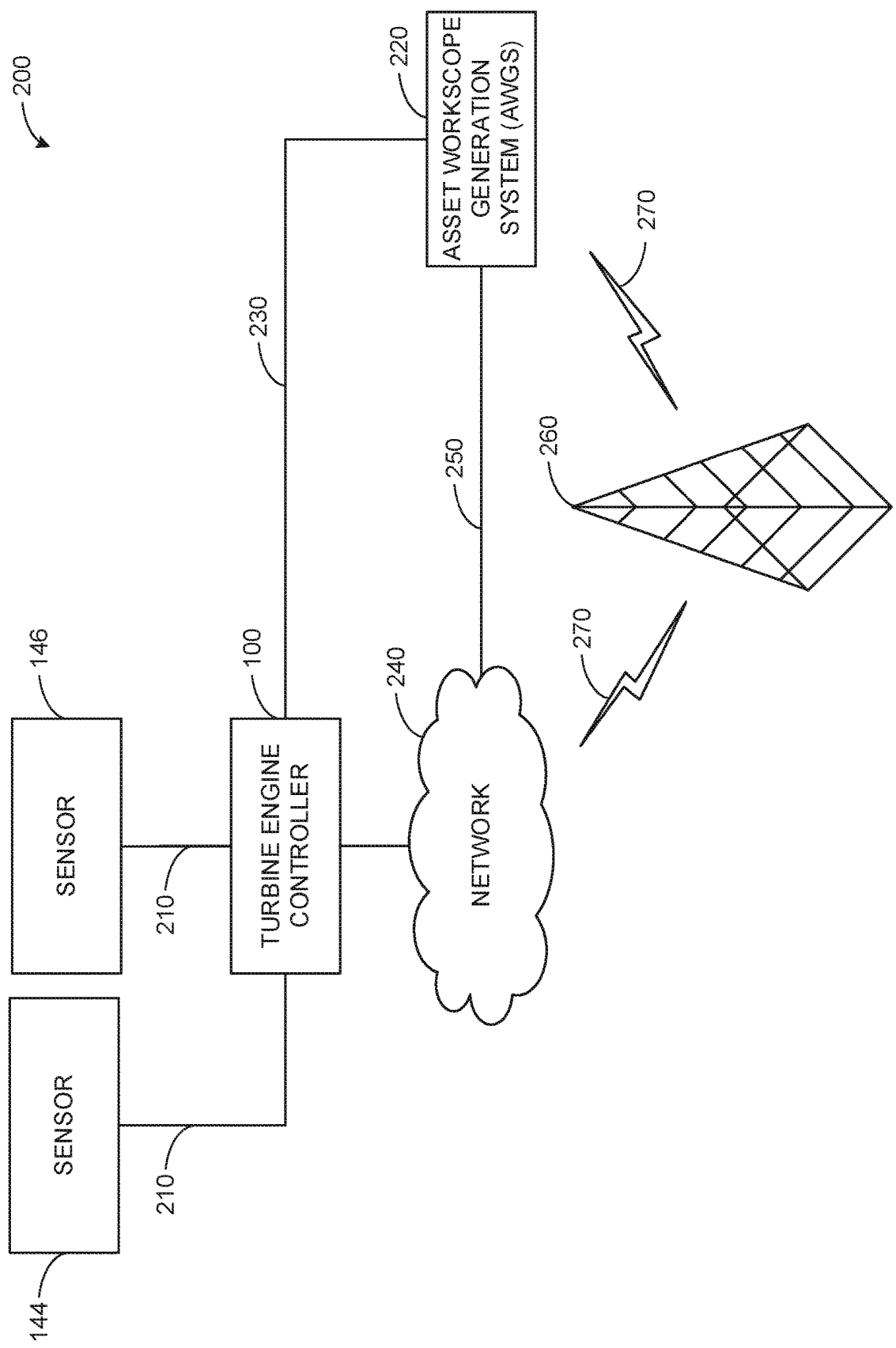
FIG. 2 is a block diagram of an example environment in which an example asset workscope generation system monitors the example gas turbine engine of FIG. 1.

FIG. 2 is a schematic illustration of an example asset monitoring system 200 for the gas turbine engine 102 of FIG. 1. In the illustrated example of FIG. 2, the sensors 144, 146 of FIG. 1 are communicatively coupled to the turbine engine controller 100 via sensor connections 210. The example turbine engine controller 100 obtains asset sensor information (e.g., a pressure, a temperature, a speed of a rotor, etc.) from the sensors 144, 146 to monitor an operation of the gas turbine engine 102. The sensor connections 210 can include direct wired or direct wireless connections. For example, a direct wired connection can involve a direct connection using wires in a harness connecting the sensors to the turbine engine controller 100, or a bus such as the Engine Area Distributed Interconnect Network (EADIN) bus. In another example, the direct wireless connections can implement a Bluetooth® connection, a Wi-Fi Direct® connection, or any other wireless communication protocol. Further shown in FIG. 2 are an example asset workscope generation system (AWGS) 220, an example AWGS direct connection 230, an example network 240, an example AWGS network connection 250, an example wireless communication system 260, and an example wireless communication links 270.

In the illustrated example of FIG. 2, the example turbine engine controller 100 is shown to be communicatively coupled to the AWGS 220 via the AWGS direct connection 230. For example, the AWGS 220 can obtain asset operation information such as flight data (e.g., altitudes, turbine engine speeds, engine exhaust temperatures, etc.), asset sensor information, etc., from the turbine engine controller 100 via the AWGS direct connection 230. The example AWGS direct connection 230 can be a direct wired or a direct wireless connection. For example, the AWGS 220 can download asset information (e.g., asset operation information, asset sensor information, etc.) of the engine 102 via a manual download of the data from the turbine engine controller 100 to a computing device such as a laptop, a server, etc., followed by a subsequent upload to the AWGS 220. Alternatively, the example AWGS 220 can be directly connected to the turbine engine controller 100 to obtain asset information.

The AWGS 220 of the illustrated example is a server that collects and processes asset information of the engine 102. Alternatively or in addition, the example AWGS 220 can be a laptop, a desktop computer, a tablet, or any type of computing device or a network including any number of computing devices. The example AWGS 220 analyzes the asset information of the engine 102 to determine an asset workscope. For example, the AWGS 220 can determine that the high-pressure compressor 116 of FIG. 1 requires a water-wash based on a comparison of an asset health quantifier of the high-pressure compressor 116 to an asset health quantifier threshold corresponding to the high-pressure compressor 116, an elapsing of a time interval specified in a contract, etc.

Additionally or alternatively, the example AWGS 220 can obtain asset information from the example turbine engine controller 100 via the network 240. For example, the AWGS 220 can obtain asset information of the engine 102 from the turbine engine controller 100 by connecting to the network 240 via the AWGS network connection 250. The example AWGS network connection 250 can be a direct wired or a direct wireless connection. For example, the turbine engine controller 100 can transmit asset information to a control system of an aircraft coupled to the engine 102. The aircraft control system can subsequently transmit the asset information to the example AWGS 220 via the network 240 (e.g., via the AWGS network connection 250, the wireless communication links 270, etc.).

The example network 240 of the illustrated example of FIG. 2 is the Internet. However, the example network 240 can be implemented using any suitable wired and/or wireless network(s) including, for example, one or more data buses, one or more Local Area Networks (LANs), one or more wireless LANs, one or more cellular networks, one or more private networks, one or more public networks, etc. The example network 240 enables the example turbine engine controller 100 to be in communication with the example AWGS 220. As used herein, the phrase "in communication," including variances therefore, encompasses direct communication and/or indirect communication through one or more intermediary components and does not require direct physical (e.g., wired) communication and/or constant communication, but rather includes selective communication at periodic and/or aperiodic intervals, as well as one-time events.

In some examples, the turbine engine controller 100 is unable to transmit asset information to the AWGS 220 via the AWGS direct connection 230, the AWGS network connection 250, etc. For example, a routing device upstream of the AWGS 220 can stop providing functional routing capabilities to the AWGS 220. In the illustrated example, the turbine engine health monitoring system 200 includes additional capabilities to enable communication (e.g., data transfer) between the AWGS 220 and the network 240. As shown in FIG. 2, the example AWGS 220 and the example network 240 include the capabilities to transmit and/or receive asset information through the example wireless communication system 260 (e.g., the cellular communication system, the satellite communication system, the air band radio communication system, the Aircraft Communications Addressing and Reporting System (ACARS), etc.) via the example wireless communication links 270.

The wireless communication links 270 of the illustrated example of FIG. 2 are cellular communication links. However, any other method and/or system of communication can additionally or alternatively be used such as an Ethernet connection, a Bluetooth connection, a Wi-Fi connection, a satellite connection, etc. Further, the example wireless communication links 270 of FIG. 2 can implement cellular connections via a Global System for Mobile Communications (GSM). However, any other systems and/or protocols for communications can be used such as Time Division Multiple Access (TDMA), Code Division Multiple Access (CDMA), Worldwide Interoperability for Microwave Access (WiMAX), Long Term Evolution (LTE), etc.

Figure 3:
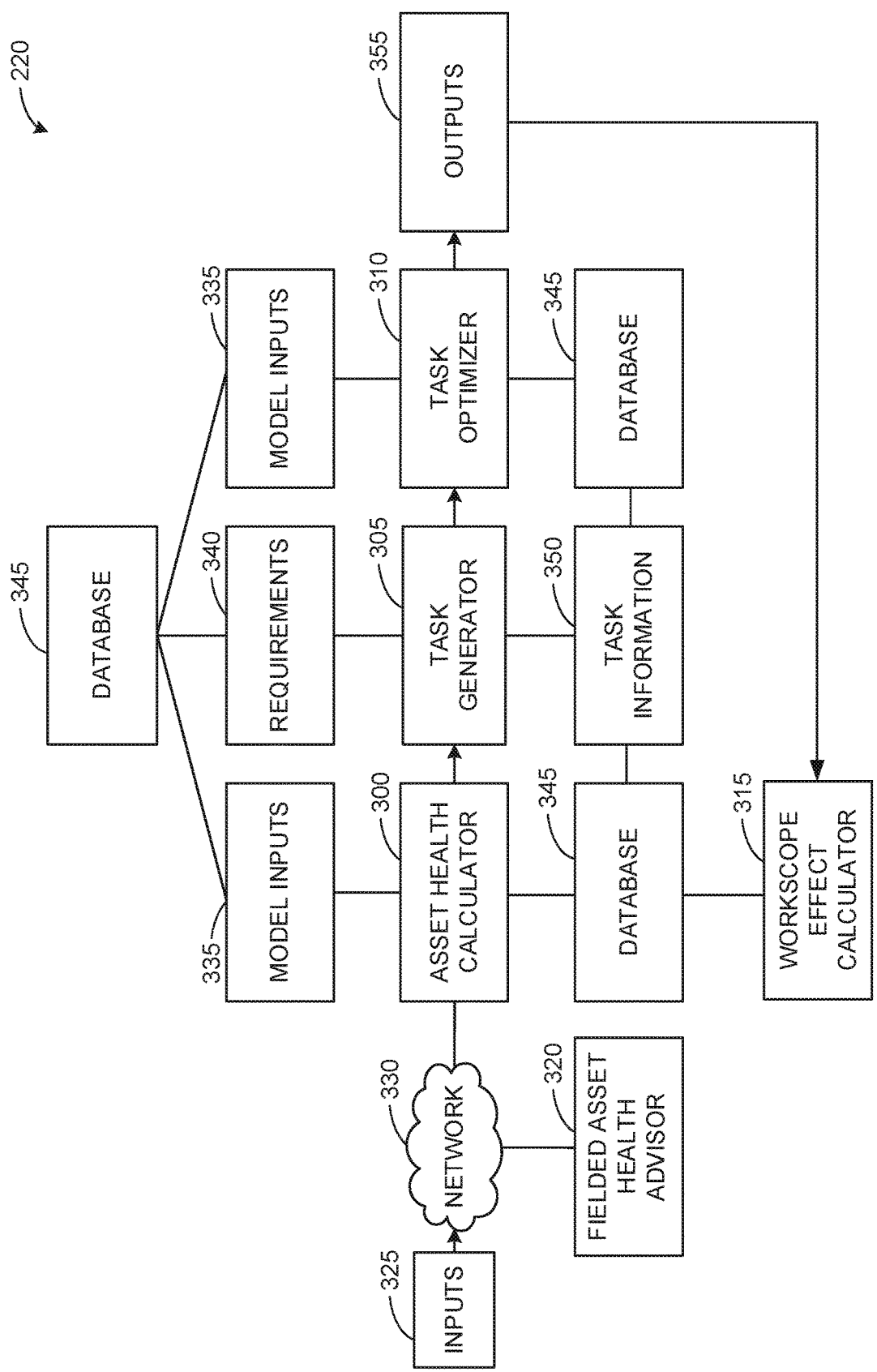
FIG. 3 is a block diagram of an example implementation of the example asset workscope generation system of FIG. 2.

FIG. 3 is a block diagram of an example implementation of the example AWGS 220 of FIG. 2. The example AWGS 220 includes an example asset health calculator 300, an example task generator 305, an example task optimizer 310, an example workscope effect calculator 315, an example fielded asset health advisor (FAHA) 320, example inputs 325, an example network 330, example model inputs 335, example requirements 340, an example database 345, example task information 350, and example outputs 355.

In the illustrated example of FIG. 3, the AWGS 220 includes the example asset health calculator 300 to identify a target asset such as the engine 102 of FIG. 1 for removal to perform a task to improve an operating condition of the target asset. In some examples, the asset health calculator 300 calculates an actual asset health quantifier (AHQ) of an asset based on the inputs 325 (e.g., asset sensor data, engine control inputs, etc.) obtained via the network 330. The example network 330 can implement or correspond to the example network 240 of FIG. 2. For example, the asset health calculator 300 can obtain inputs based on an inspection of the asset by an asset maintenance technician. In another example, the asset health calculator 300 can obtain asset information from the turbine engine controller 100 of the engine 102 of FIGS. 1-2 via the AWGS direct connection 230 of FIG. 2, the AWGS network connection 250 of FIG. 2, the wireless communication links 270 of FIG. 2, etc.

In some examples, the asset health calculator 300 calculates a projected AHQ based on the model inputs 335. For example, the asset health calculator 300 can estimate an operating condition of the engine 102 after the engine 102 completes a specified number of cycles (e.g., flight cycles, operation cycles, etc.). For example, the asset health calculator 300 can simulate the engine 102 completing the specified number of flight cycles by executing a digital twin model of the engine 102 for the specified number of flight cycles. As used herein, the term "flight cycle" refers to a complete operation cycle of an aircraft flight executed by an asset including a take-off operation and a landing operation.

As used herein, the term "digital twin" refers to a digital representation, a digital model, or a digital "shadow" corresponding to a digital informational construct about a physical system. That is, digital information can be implemented as a "twin" of a physical device/system (e.g., the engine 102, etc.) and information associated with and/or embedded within the physical device/system. The digital twin is linked with the physical system through the lifecycle of the physical system. In certain examples, the digital twin includes a physical object in real space, a digital twin of that physical object that exists in a virtual space, and information linking the physical object with its digital twin. The digital twin exists in a virtual space corresponding to a real space and includes a link for data flow from real space to virtual space as well as a link for information flow from virtual space to real space and virtual sub-spaces. The links for data flow or information flow correspond to a digital thread that represents a communication framework between sources of data and the digital twin model. The digital thread can enable an integrated view of asset data throughout a lifecycle of the asset. For example, the digital twin model can correspond to the virtual model of the asset and the digital thread can represent the connected data flow between an asset data source and the virtual model.

In some examples, the asset health calculator 300 identifies a target asset for removal based on comparing an actual AHQ to an actual AHQ threshold and identifying the target asset for removal based on the comparison. In some examples, the asset health calculator identifies a target asset for removal based on comparing a projected AHQ to a projected AHQ threshold and identifying the target asset for removal based on the comparison. In some examples, the asset health calculator 300 generates a removal schedule for one or more target assets based on requirements such as contractual requirements, maintenance resources, spare part inventory, etc., and/or a combination thereof.

In some examples, the AHQ threshold (e.g., the actual AHQ threshold, the projected AHQ threshold, etc.) of an asset, an asset component, etc., represents an indicator, which when satisfied, corresponds to the asset, the asset component, etc., being identified as a candidate for removal to perform maintenance, service, etc. For example, the asset health calculator 300 can compare an actual AHQ of 50 cycles (e.g., flight cycles, flight operations, etc.) remaining (e.g., until service can be performed, until the asset component is taken off-wing, etc.) for the booster compressor 114 of FIG. 1 to an actual AHQ threshold of 100 cycles remaining and identify the booster compressor 114 of FIG. 1 as a candidate for removal based on the actual AHQ being less than the actual AHQ threshold. In another example, the asset health calculator 300 can compare an actual AHQ of 200 hours operating remaining for the booster compressor 114 of FIG. 1 to an actual AHQ threshold of 250 hours operating remaining and identify the booster compressor 114 of FIG. 1 as a candidate for removal based on the actual AHQ being less than the actual AHQ threshold. For example, the actual AHQ threshold, the projected AHQ threshold, etc., can be determined based on a contractual requirement, historical-based information of previously repaired assets and/or asset components, etc.

In the illustrated example of FIG. 3, the AWGS 220 includes the task generator 305 to generate a workscope task for the target asset based on obtaining an AHQ from the asset health calculator 300. For example, the task generator 305 can obtain an AHQ for the engine 102, an AHQ for the booster compressor 114 of the engine 102, etc. In some examples, the task generator 305 identifies an asset component to be processed based on comparing an AHQ to an AHQ threshold and identifying the asset component based on the comparison. For example, the task generator 305 can compare an actual AHQ of 30% useful life remaining for the booster compressor 114 to an actual AHQ threshold of 50% useful life remaining and identify the booster compressor 114 for replacement based on the actual AHQ being less than the actual AHQ threshold.

In some examples, the task generator 305 identifies an asset component to be processed based on the requirements 340 obtained from the database 345. For example, the task generator 305 can compare an actual AHQ of 100 cycles for the booster compressor 114 to an actual AHQ threshold of 200 cycles for the booster compressor 114 based on contractual requirements (e.g., a contract specifies that a booster compressor must be serviced when the actual AHQ goes below 200 cycles). In such an example, the task generator 305 can identify the booster compressor 114 for processing based on the actual AHQ being less than the actual AHQ threshold.

In response to identifying one or more asset components to be processed, the example task generator 305 can generate a set of workscope tasks that can be performed on the one or more asset components. For example, the task generator 305 can determine the set of tasks based on obtaining the task information 350 from the database 345. For example, the task generator 305 can query the database 345 with the identified component for processing (e.g., the booster compressor 114) and the actual AHQ of the component, and the database 345 can return task information including a list of tasks that can be performed with corresponding costs (e.g., labor costs, monetary costs, etc.), spare parts, tools, etc., for each task in the list.

In the illustrated example of FIG. 3, the AWGS 220 includes the task optimizer 310 to identify an optimized workscope for a target asset based on the generated workscope tasks for the target asset and the model inputs 335. For example, the task optimizer 310 can generate a plurality of workscopes in which each workscope includes a combination of one or more of the workscope tasks obtained from the task generator 305. In such an example, the task optimizer 310 can store the plurality of workscopes in the database 345.

In some examples, the task optimizer 310 calculates an estimate asset health quantifier for the target asset to generate quantifiable metrics to evaluate an accuracy or an efficiency of the AWGS 220 in improving an operating condition of the engine 102. For example, the task optimizer 310 can calculate an asset health quantifier for the target asset in response to performing a specified workscope on the target asset. For example, the task optimizer 310 can obtain an actual AHQ of the target asset calculated by the asset health calculator 300, select a workscope of interest for the target asset, and calculate an estimate AHQ of the target asset if the selected workscope were to be performed on the target asset. In some examples, the workscope effect calculator 315 calculates an actual AHQ of the target asset after the selected workscope is completed on the target asset and compares the actual AHQ to the estimate asset health quantifier calculated by the task optimizer 310 to determine an accuracy of the AWGS 220 based on the comparison.

In some examples, the task optimizer 310 calculates an estimate AHQ by executing one or models such as a digital twin model of the target asset to generate the model inputs 335. For example, a digital twin model can be implemented using an artificial neural network and/or other machine learning/artificial intelligence to form connections between inputs and outputs and drive evaluation and behavior through patterns, feedback, optimization, etc.

In some examples, the task optimizer 310 calculates an estimate asset health quantifier for each one of the generated workscopes. In some examples, the task optimizer 310 selects a workscope to be performed on the target asset based on one or more factors such as comparisons of the calculated estimate asset health quantifiers to contractual requirements, customer requirements, operational constraints, etc., and/or a combination thereof. In such examples, the outputs 355 correspond to the selected workscope including a set of tasks to be performed on the target asset and corresponding workscope information. For example, the workscope information can include an assignment of maintenance personnel, a service facility, spare parts, tools, etc., to the workscope based on a removal schedule identified by the asset health calculator 300.

In the illustrated example of FIG. 3, the AWGS 220 includes the workscope effect calculator 315 to generate a predictive asset health quantifier of a turbine engine. For example, the workscope effect calculator 315 can determine one or more de-rate parameters of the turbine engine based on the inputs 325. For example, the workscope effect calculator 315 can determine a value for a takeoff de-rate parameter, a climb de-rate parameter, etc., of the engine 102. The example workscope effect calculator 315 can analyze the de-rate parameters to identify opportunities for increasing TOW, lowering turbine engine maintenance cost, etc., of the engine 102 while respecting operator metrics (e.g., fuel burn, mission times, etc.).

In some examples, the workscope effect calculator 315 generates asset and/or asset component performance and severity models based on the deviations. For example, the workscope effect calculator 315 can translate the impact of environmental factors, operational factors, etc., to asset and/or asset component health factors that drive maintenance operations of the asset and/or the asset components. In some examples, the workscope effect calculator 315 generates a severity model using historical information. For example, the workscope effect calculator 315 can generate an asset health quantifier of an asset component as a function of TOW and an environmental or an operational condition. For example, the workscope effect calculator 315 can generate a severity model that maps TOW of an asset component such as a high-pressure compressor to one or more environmental parameters of significance to component life (e.g., TOW, etc.).

In some examples, the workscope effect calculator 315 generates recommendations to optimize and/or otherwise improve operator behavior corresponding to takeoff de-rate parameters, climb de-rate parameters, etc., when the asset is on-wing of an aircraft. For example, the workscope effect calculator 315 can generate a recommendation to adjust the operator behavior to increase TOW and improve turbine engine performance. For example, the workscope effect calculator 315 can generate a recommendation to change a climb time, a taper schedule (e.g., a turbine engine de-rate taper schedule, etc.), a de-rate parameter, etc., of the asset when on-wing of the aircraft. As used herein, the term "taper schedule" refers to a scheduled de-rating operation of a turbine engine as the turbine engine transitions between flight segments of a flight cycle. For example, the taper schedule can include instructions to operate the turbine engine at 5% de-rate during a takeoff and departure flight segment, at 15% de-rate during a climb flight segment, and at 40% de-rate during a cruise flight segment.

In some examples, the workscope effect calculator 315 generates a report including the recommendations. For example, the workscope effect calculator 315 can generate a report including a candidate improvement plan for identified operators as candidate improvement targets. For example, the candidate improvement plan can include a recommendation to change the climb time, the taper schedule, the de-rate parameter, etc., of the asset when on-wing of the aircraft. In some examples, the workscope effect calculator 315 generates an alert dashboard (e.g., an alert dashboard in a report, an alert dashboard in a web-based software application, etc.) indicating areas of improvement for an operator to improve TOW and to reduce maintenance cost of an asset.

In some examples, the workscope effect calculator 315 calculates an effect of performing a workscope on a target asset. In some examples, the workscope effect calculator 315 calculates a workscope quantifier which represents an accuracy or an efficiency of the AWGS 220 in improving an operating condition of the engine 102. In some examples, the workscope effect calculator 315 calculates an actual AHQ of the target asset in response to the selected workscope being performed on the target asset. In some examples, the workscope effect calculator 315 calculates the actual AHQ based on an inspection (e.g., a visual inspection, etc.) from maintenance personnel, sensor data from the sensors 144, 146 of FIG. 2, etc., and/or a combination thereof. For example, the workscope effect calculator 315 can calculate an actual AHQ of the high-pressure turbine 120 based on comparing (1) a first pressure value and/or a first temperature value of the high-pressure turbine 120 obtained from the sensors 144, 146 of FIG. 2 prior to the selected workscope being performed to (2) a second pressure value and/or a second temperature value of the high-pressure turbine 120 obtained from the sensors 144, 146 after the selected workscope being performed. In such an example, the workscope effect calculator 315 can calculate the actual AHQ based on the comparison.

In some examples, the workscope effect calculator 315 calculates a workscope quantifier based on comparing a first asset health quantifier of a target asset to a second asset health quantifier of the target asset. For example, the workscope effect calculator 315 can calculate a workscope quantifier based on a first actual AHQ calculated by the task optimizer 310 prior to a workscope being performed on the engine 102 and a second actual AHQ calculated by the workscope effect calculator 315 after a completion of the workscope. For example, the workscope quantifier can be a difference between the first and the second actual AHQ, a ratio of the first and the second actual AHQ, etc. For example, the workscope effect calculator 315 can calculate a workscope quantifier of 10% based on a difference between a first actual AHQ of 90% calculated by the task optimizer 310 and a second actual AHQ of 80% calculated by the workscope effect calculator 315 (e.g., 10%=90%−80%, etc.). In such an example, the workscope effect calculator 315 can determine that the AWGS 220 can be improved because the selected workscope did not improve an operating condition of the engine 102 to a level anticipated by the AWGS 220.

In some examples, the workscope effect calculator 315 modifies one or more components of the AWGS 220 based on the operator behavior (e.g., a de-rating behavior of owner assets, etc.). In some examples, the workscope effect calculator 315 modifies the one or more components of the AWGS 220 by calculating a workscope quantifier, comparing the workscope quantifier to a workscope quantifier threshold, and determining whether the workscope quantifier satisfies the workscope quantifier threshold based on the comparison. In some examples, the workscope quantifier threshold represents an indicator, when satisfied, identifies that the AWGS 220 can be improved by updating one or more components of the AWGS 220. For example, the workscope effect calculator 315 can obtain a first actual AHQ for the booster compressor 114 from the database 345 corresponding to an actual AHQ of 90% useful life remaining calculated by the task optimizer 310. The example workscope effect calculator 315 can generate a second actual AHQ of 70% useful life remaining based on an inspection of the booster compressor 114, the sensor data from the sensors 144, 146, etc.

The example workscope effect calculator 315 can calculate a workscope quantifier of 20% based on calculating a difference between the first and the second actual AHQ (e.g., 20%=90%−70%, etc.). In another example, the workscope effect calculator 315 can calculate a workscope quantifier of 0.78 based on calculating a ratio of the first and the second actual AHQ (e.g., 0.78=0.70÷0.90, etc.). In such an example, the workscope effect calculator 315 can compare the workscope quantifier of 0.78 to a workscope quantifier threshold of 0.85 and determine whether the workscope quantifier satisfies the workscope quantifier threshold. For example, the workscope effect calculator 315 can determine to modify a component of the AWGS 220 based on the workscope quantifier being less than the workscope quantifier threshold.

In response to determining that the workscope quantifier satisfies the workscope quantifier threshold, the example workscope effect calculator 315 can regenerate the example asset health calculator 300, the example task generator 305, the example task optimizer 310, the example model inputs 335, the example requirements 340, the example database 345, the example task information 350, etc., and/or a combination thereof. For example, the workscope effect calculator 315 can direct a digital twin model of the engine 102 to update to a latest version of the digital twin model incorporating up-to-date historical trend information, model parameters, model algorithms, etc. In another example, the workscope effect calculator 315 can direct the database 345 to update to include a latest version of the task information 350. In yet another example, the workscope effect calculator 315 can direct the task optimizer 310 to update one or more algorithms, calculation parameters, etc., used by the task optimizer 310 to a latest version.

In the illustrated example of FIG. 3, the AWGS 220 includes the FAHA 320 to generate a recommendation to improve operational usage of an asset. In some examples, the FAHA 320 obtains sensor data from the sensors 144, 146 of FIG. 2, model information (e.g., outputs from a physics-based model of an asset, a stochastic model of an asset, etc.), etc., to generate analytics and diagnostics corresponding to a health of the asset. For example, the FAHA 320 can be a software application executing on a computing device (e.g., a desktop computer, a tablet, a smartphone, etc.) to generate asset health information (e.g., an actual AHQ, a projected AHQ, etc.), asset usage recommendations, etc. In other examples, the FAHA 320 can be implemented as a dedicated hardware device (e.g., an application-specific integrated circuit, firmware device, etc.) to monitor asset operation and generate asset health information, asset usage recommendation, etc.

In the illustrated example, the FAHA 320 is communicatively coupled to the network 330. For example, the FAHA 320 can obtain sensor data from the sensors 144, 146, obtain an up-to-date version of one or more models, obtain an up-to-date version of an algorithm or a calculation parameter used by the asset health calculator 300, etc., via the network 330. Alternatively, the example FAHA 320 may not be communicatively coupled to the network 330 (e.g., the FAHA 320 is executing on a standalone device not communicatively coupled to the network 330, etc.).

In the illustrated example of FIG. 3, the AWGS 220 includes the database 345 to record data (e.g., asset health quantifiers, workscope quantifiers, the inputs 325, the model inputs 335, the requirements 340, the task information 350, etc.). In the illustrated example, the database 345 is communicatively coupled to the asset health calculator 300, the task generator 305, the task optimizer 310, the workscope effect calculator 315, and the FAHA 320 (e.g., when communicatively coupled to the network 330, etc.). The example database 345 can respond to queries for information related to data in the database 345. For example, the database 345 can respond to queries for additional data by providing the additional data (e.g., the one or more data points), by providing an index associated with the additional data in the database 345, etc. The example database 345 can additionally or alternatively respond to queries when there is no additional data in the database 345 by providing a null index, an end of database identifier, etc. For example, the asset health calculator 300 can query the database 345 for asset sensor data, asset environmental data, utilization data, etc., corresponding to the engine 102. In response to the query, the example database 345 can transmit the data and corresponding information such as data logs, maintenance history, etc., to the example asset health calculator 300.

The example database 345 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example database 345 can additionally or alternatively be implemented by one or more double data rate (DDR) memories, such as DDR, DDR2, DDR3, DDR4, mobile DDR (mDDR), etc. The example database 345 can additionally or alternatively be implemented by one or more mass storage devices such as hard disk drive(s), compact disk drive(s) digital versatile disk drive(s), solid-state drives, etc. While in the illustrated example the database 345 is illustrated as a single database, the database 345 can be implemented by any number and/or type(s) of databases.

While an example implementation of the AWGS 220 of FIG. 2 is illustrated in FIG. 3, one or more of the elements, processes, and/or devices illustrated in FIG. 3 may be combined, divided, re-arranged, omitted, eliminated, and/or implemented in any other way. Further, the example asset health calculator 300, the example task generator 305, the example task optimizer 310, the example workscope effect calculator 315, the example FAHA 320, the example inputs 325, the example network 330, the example model inputs 335, the example requirements 340, the example database 345, the example task information 350, the example outputs 355 and/or, more generally, the example AWGS 220 of FIG. 3 may be implemented by hardware, software, firmware and/or any combination of hardware, software and/or firmware. Thus, for example, any of the example asset health calculator 300, the example task generator 305, the example task optimizer 310, the example workscope effect calculator 315, the example FAHA 320, the example inputs 325, the example network 330, the example model inputs 335, the example requirements 340, the example database 345, the example task information 350, the example outputs 355 and/or, more generally, the example AWGS 220 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example asset health calculator 300, the example task generator 305, the example task optimizer 310, the example workscope effect calculator 315, the example FAHA 320, the example inputs 325, the example network 330, the example model inputs 335, the example requirements 340, the example database 345, the example task information 350, and/or the example outputs 355 is/are hereby expressly defined to include a non-transitory computer readable storage device or storage disk such as a memory, a digital versatile disk (DVD), a compact disk (CD), a Blu-ray disk, etc. including the software and/or firmware. Further still, the example AWGS 220 of FIG. 2 may include one or more elements, processes and/or devices in addition to, or instead of, those illustrated in FIG. 3, and/or may include more than one of any or all of the illustrated elements, processes, and devices.

Figure 4:
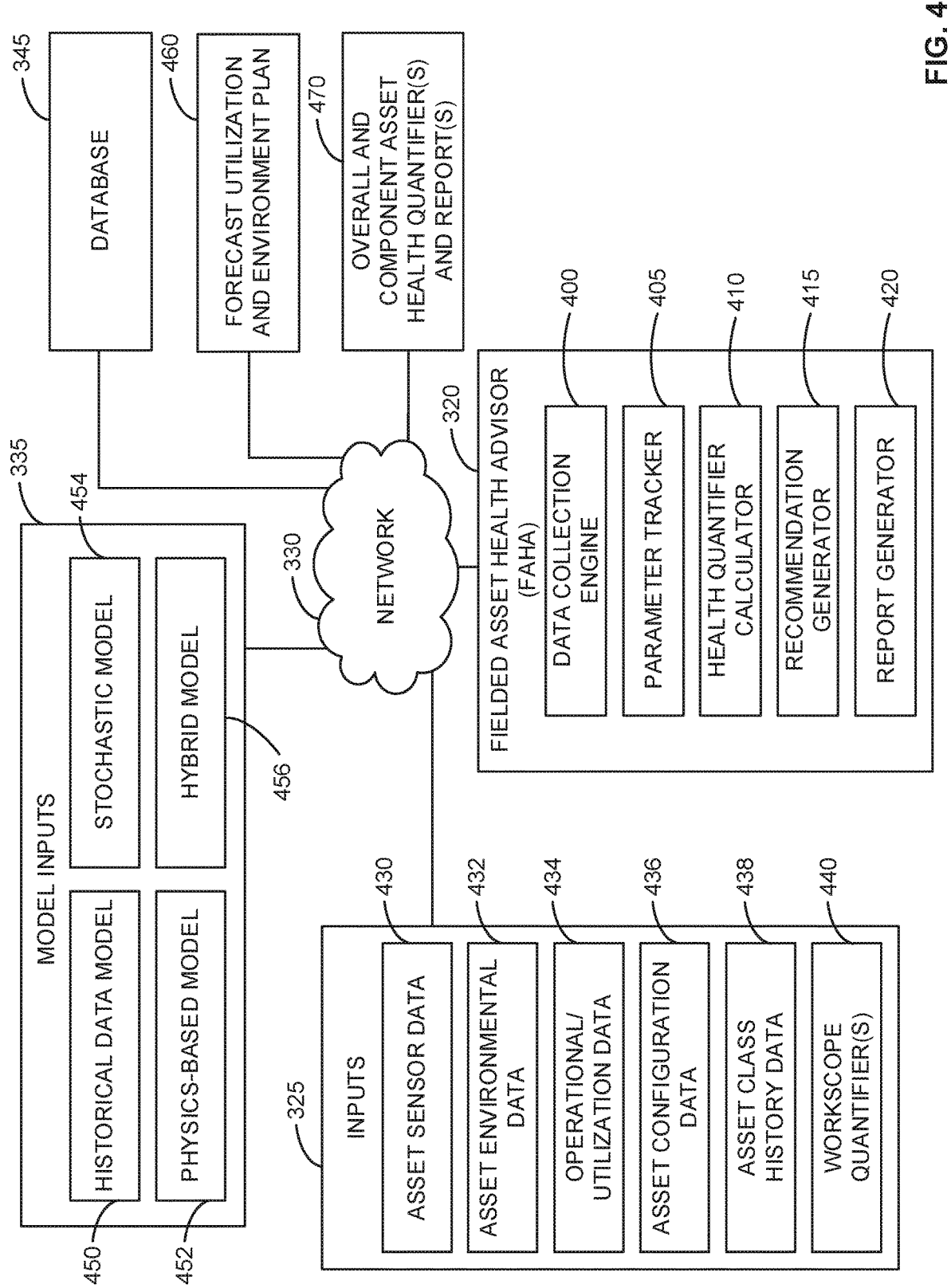
FIG. 4 is a block diagram of an example implementation of an example fielded asset health advisor apparatus.

FIG. 4 is a block diagram of an example implementation of the example FAHA 320 of FIG. 3. The FAHA 320 of the illustrated example calculates, aggregates, and ranks AHQ (e.g., actual AHQ, projected AHQ, etc.) of an asset (e.g., the engine 102 of FIG. 1), an asset component (e.g., the booster compressor 114, the high-pressure turbine 120, etc.), etc. The FAHA 320 includes an example data collection engine 400, an example parameter tracker 405, an example health quantifier calculator 410, an example recommendation generator 415, and an example report generator 420.

In the illustrated example of FIG. 4, the FAHA 320 includes the example data collection engine 400 to obtain information of interest to process. In the illustrated example, the data collection engine 400 obtains the inputs 325 to process. For example, the data collection engine 400 can obtain the inputs 325 from the network 330 of FIG. 3. The inputs 325 of the illustrated example include example asset sensor data 430, example asset environmental data 432, example operational/utilization data 434, example asset configuration data 436, example asset class history data 438, and example workscope quantifier(s) 440.

In the illustrated example, the data collection engine 400 obtains the asset sensor data 430 to determine operating conditions experienced by the engine 102 of FIG. 1. In some examples, the asset sensor data 430 corresponds to inputs to the engine 102. For example, the asset sensor data 430 can include an engine command (e.g., a thrust control input, a de-rate control input, etc.), an engine input, etc. For example, the asset sensor data 430 can correspond to information obtained from a closed loop control module included in the turbine engine controller 100 of FIGS. 1-2. For example, the asset sensor data 430 can include parameters generated by an algorithm executed by the turbine engine controller 100 in response to an engine control input, an environmental factor, etc.

In some examples, the data collection engine 400 obtains the asset sensor data 430 from the database 345 of FIG. 3. In some examples, the asset sensor data 430 corresponds to sensor data obtained from the sensors 144, 146 of FIG. 2. For example, the asset sensor data 430 can include sensor measurements such as a speed of a rotor, a pressure, a temperature, a vibration, etc., experienced by the engine 102 of FIG. 1. In some examples, the asset sensor data 430 includes a range of sensor measurements for an environmental parameter (e.g., a pressure, a temperature, etc.) measured by an environmental parameter sensor (e.g., a pressure sensor, a temperature sensor, etc.). In some examples, the asset sensor data 430 includes a duration of sensor measurements such as an amount of time the sensors 144, 146 measured a specific sensor measurement (e.g., an amount of time the sensors 144, 146 measured a pressure value of 100 PSI, an amount of time the sensors 144, 146 measured a temperature value of 2400 Rankine, etc.).

In some examples, the asset sensor data 430 includes information corresponding to a current or an instant flight segment of the asset. For example, the asset sensor data 430 can include information from an aircraft control system, the turbine engine controller 100 of FIG. 2, etc., indicating that the engine 102 of FIG. 1 is on-wing of an aircraft currently taking off, climbing, cruising, etc. In some examples, the data collection engine 400 determines that the asset sensor data 430 is transient asset data. For example, the data collection engine 400 can determine that the asset sensor data 430 is transient asset data based on the engine 102 operating during a transient flight segment or a transition between flight segments (e.g., transitioning from a climbing flight segment to a cruising flight segment, etc.). In some examples, the data collection engine 400 determines that the asset sensor data 430 is steady-state asset data. For example, the data collection engine 400 can determine that the asset sensor data 430 is steady-state asset data based on the engine 102 operating during a cruising flight segment. In such an example, the data collection engine 400 can determine that the asset sensor data 430 is generated (e.g., iteratively generated, etc.) based on similar (e.g., substantially similar, relatively unchanging, etc.) environmental and operating conditions.

In the illustrated example, the data collection engine 400 obtains the asset environmental data 432 to determine environmental conditions experienced by the engine 102. In some examples, the data collection engine 400 obtains the asset environmental data 432 from the database 345 of FIG. 3. In some examples, the asset environmental data 432 includes a range of environmental condition parameters experienced by the engine 102. For example, the asset environmental data 432 can include a range of ambient temperatures (e.g., a range of 10-40 degrees Celsius, etc.), precipitation amounts, salt atmosphere percentages (e.g., a range of 5-55% salt atmosphere, etc.), airborne particulate matter sizes (e.g., a size of a man-made airborne particulate matter, a size of a naturally occurring airborne particulate matter, etc.), humidity percentages (e.g., a range of 40-95% humidity, etc.), etc., experienced by the engine 102. In some examples, the asset environmental data 432 includes a duration of environmental condition parameters experienced by the engine 102. For example, the asset environmental data 432 can include an amount of time the engine 102 experienced a salt atmosphere of 30%, 40%, 50%, etc.

In the illustrated example of FIG. 4, the data collection engine 400 obtains the operational/utilization data 434 to determine a usage of the engine 102. In some examples, the operational/utilization data 434 includes a utilization plan of the engine 102. For example, the operational/utilization data 434 can include a number of cycles (e.g., flight cycles, operation cycles, etc.), a number of hours in operation, types of flight routes (e.g., flights from a first destination to a second destination, etc.), a number of flight legs (e.g., a number of hours from a first destination to a second destination, etc.), etc., completed by the engine 102. In some examples, the operational/utilization data 434 includes operating behavior of one or more assets by one or more airline operators. For example, the operational/utilization data 434 can include operating rating information corresponding to an operation of the engine 102 compared to a rated maximum capacity of the turbine engine. For example, the operational/utilization data 434 can include average takeoff de-rate information, average climb de-rate information, etc. In another example, the operational/utilization data 434 can include an average thrust parameter of the engine 102, a percentage indicating how often the engine 102 is at full power during one or more cycles, etc.

In the illustrated example of FIG. 4, the data collection engine 400 obtains the asset configuration data 436 to determine a current or an instant configuration of the engine 102. In some examples, a physical and/or software configuration of the engine 102 can be updated, upgraded, etc., over time as maintenance is performed on the engine 102. For example, the engine 102 can be refurbished with new components, upgraded components, etc. In another example, software of the turbine engine controller 100 of the engine 102 can be upgraded to adjust or control a variable geometry of the engine 102 when in operation. In such examples, the asset configuration data 436 can include a current list of components in the engine 102, a current software version of the turbine engine controller 100, etc.

In the illustrated example of FIG. 4, the data collection engine 400 obtains the asset class history data 438 to determine a baseline operation parameter, performance parameter, reliability parameter, etc., of an asset in response to upgrading a hardware and/or a software component of the asset. For example, an asset class can correspond to a fleet of substantially similar assets used to generate a baseline durability parameter or a baseline reliability parameter by analyzing durability parameters, reliability parameters, etc., for the fleet. For example, the engine 102 can belong to a first asset class corresponding to a first baseline durability parameter, a first baseline reliability parameter, etc.

In such an example, an upgrade in a hardware and/or a software component of the engine 102 can cause the engine 102 to correspond to a second asset class corresponding to a second baseline durability parameter, a second baseline reliability parameter, etc., where the second parameters can be an improvement compared to the first parameters. In some examples, the data collection engine 400 obtains the asset class history data 438 to ensure that the parameter tracker 405, the health quantifier calculator 410, etc., uses the model inputs 335 based on the current asset class of the engine 102 compared to a previous asset class of the engine 102 (e.g., an asset class of the engine 102 prior to an upgrade, etc.).

In the illustrated example of FIG. 4, the data collection engine 400 obtains the one or more workscope quantifiers 440 to determine an accuracy of AHQ generated by the asset health calculator 300 and/or the FAHA 320. For example, the data collection engine 400 can obtain a workscope quantifier of 10%, 20%, 30%, etc., calculated by the workscope effect calculator 315. For example, the FAHA 320 can determine to update one or more parameters of the FAHA 320 based on the workscope quantifier. For example, the FAHA 320 can update the model inputs 335 by updating (e.g., directing an updating, etc.) a historical data model 450, a physics-based model 452, a stochastic model 454, a hybrid model 456, etc., and/or a combination thereof to incorporate a latest version of information, parameter values, etc.

In the illustrated example of FIG. 4, the FAHA 320 includes the parameter tracker 405 to execute a tracking filter based on tracking filter data to calculate calibrated simulated sensor data. In some examples, the tracking filter data includes simulated asset sensor data (e.g., simulated steady-state asset sensor data, simulated transient asset sensor data, etc.) corresponding to the engine 102 of FIG. 1. In some examples, the parameter tracker 405 obtains the simulated asset sensor data based on the model inputs 335. In some examples, the parameter tracker 405 obtains the simulated asset sensor data from the database 345.

In some examples, the tracking filter data includes simulated steady-state asset sensor data. For example, the parameter tracker 405 can obtain simulated steady-state exhaust gas-path temperature (EGT) sensor data of the engine 102 by simulating the sensors 144, 146 of FIGS. 1-2 in a steady-state. For example, the parameter tracker 405 can direct the physics-based model 452 to simulate the engine 102 using operating conditions corresponding to an aircraft in a steady-state such as a cruising flight segment to generate simulated steady-state EGT sensor data.

In some examples, the tracking filter data includes transient asset sensor data. For example, the parameter tracker 405 can obtain simulated transient EGT sensor data of the engine 102 by simulating the sensors 144, 146 of FIGS. 1-2 in a transient state. For example, the parameter tracker 405 can direct the physics-based model 452 to simulate the engine 102 using operating conditions corresponding to an aircraft in a transient state such as transitioning from a climbing flight segment to a cruising flight segment to generate simulated transient EGT sensor data. For example, the physics-based model 452 can simulate a sensor using a sensor model generated by calibrating (e.g., iteratively calibrating, etc.) the sensor and the sensor model during manufacturing, testing, real-time operation etc., of the sensor. In another example, the parameter tracker 405 can direct the physics-based model 452 to simulate the engine 102 using operating conditions corresponding to an aircraft in a transient flight segment such as the takeoff and departure flight segment to generate simulated transient EGT sensor data.

In some examples, the tracking filter data includes physical sensor-based asset sensor data based on obtaining steady-state asset sensor data, transient asset sensor data, etc., from the sensors 144, 146 of FIGS. 1-2 (e.g., a physical sensor-based asset parameter, a non-simulated asset parameter, etc.). In some examples, the parameter tracker 405 obtains the physical sensor-based asset sensor data corresponding to the engine 102 by obtaining the asset sensor data 430.

In some examples, the tracking filter data includes physical sensor-based steady-state asset sensor data. For example, the parameter tracker 405 can obtain physical sensor-based steady-state EGT sensor data of the engine 102 by obtaining EGT sensor data from the sensors 144, 146 of FIGS. 1-2 in steady-state. For example, the parameter tracker 405 can obtain physical sensor-based steady-state EGT sensor data by obtaining the asset sensor data 430 from the sensors 144, 146 of FIGS. 1-2 during operating conditions corresponding to an aircraft in a steady-state such as a cruising flight segment.

In some examples, the tracking filter data includes physical sensor-based transient asset sensor data. For example, the parameter tracker 405 can obtain physical sensor-based transient EGT sensor data of the engine 102 by obtaining EGT sensor data from the sensors 144, 146 of FIGS. 1-2 in a transient state. For example, the parameter tracker 405 can obtain physical sensor-based transient EGT sensor data by obtaining the asset sensor data 430 from the sensors 144, 146 of FIGS. 1-2 during operating conditions corresponding to an aircraft in a transient state such as a transitioning from a climbing flight segment to a cruising flight segment.

In some examples, the parameter tracker 405 selects tracking filter data to be used by the tracking filter based on the steady-state asset sensor data and/or the transient asset sensor data. For example, the parameter tracker 405 can select the tracking filter data to include steady-state asset sensor data, transient asset sensor data, etc., and/or a combination thereof. For example, the parameter tracker 405 can select the tracking filter data to include steady-state asset sensor data (e.g., simulated steady-state asset sensor data, physical sensor-based steady-state asset sensor data, etc.) and/or transient asset sensor data (e.g., simulated transient asset sensor data, physical sensor-based transient asset sensor data, etc.).

In some examples, the parameter tracker 405 determines that the tracking filter data includes only steady-state asset sensor data. In some examples, the parameter tracker 405 determines that the tracking filter data includes only the transient asset sensor data. In some examples, the parameter tracker 405 determines that the tracking filter data includes a combination of the steady-state asset sensor data and the transient asset sensor data. For example, the parameter tracker 405 can merge steady-state operation points with snapshots, snippets, etc., of transient operation periods compared to using a long window of transient operation data. For example, the parameter tracker 405 can calculate average tracking filter data at a first time instance or during a first time interval based on an average of (1) steady-state asset sensor data at the first time instance or during the first time interval and (2) transient asset sensor data at the first time instance or during the first time interval. In another example, the parameter tracker 405 can select the tracking filter data to include (1) steady-state asset sensor data for a second time instance or for a second time interval and select (2) transient asset sensor data for a third time instance or for a third time interval.

In some examples, the parameter tracker 405 uses a tracking filter (e.g., a Kalman filter, etc.) to calculate a difference between the simulated asset sensor data and the physical sensor-based asset sensor data. In some examples, the parameter tracker 405 uses the tracking filter to calculate calibrated asset sensor data based on the difference between simulated and acquired asset sensor data. For example, the parameter tracker 405 can calculate a difference between (1) simulated EGT sensor data of the engine 102 based on the model inputs 335 and (2) actual EGT sensor data of the engine 102 based on the asset sensor data 430. In such an example, the parameter tracker 405 can calculate calibrated asset sensor data based on the difference between the simulated EGT sensor data and the actual EGT sensor data.

In some examples, the parameter tracker 405 transmits the calibrated asset sensor data to one or more of the models 450, 452, 454, 456 of FIG. 4, the database 345, etc., to re-calculate the model inputs 335. For example, the parameter tracker 405 can determine that the model inputs 335 are diverging from the asset sensor data 430 obtained from the engine 102. For example, the parameter tracker 405 can transmit the calibrated asset sensor data to the physics-based model 452 to optimize and/or otherwise improve functionality of the physics-based model 452 to generate AHQ, simulated sensor data, etc., to minimize the divergence from the asset sensor data 430. For example, the physics-based model 452 can use the calibrated asset sensor data to generate simulated sensor data that tracks more accurately with the asset sensor data 430 obtained from the engine 102.

In the illustrated example of FIG. 4, the FAHA 320 includes the health quantifier calculator 410 to calculate actual AHQ, projected AHQ, etc., based on the model inputs 335. For example, the FAHA 320 can use the health quantifier calculator 410 to calculate AHQ of the engine 102 of FIG. 1 based on the model inputs 335 while the engine 102 is on-wing of an aircraft or while the engine 102 is fielded, prior to a maintenance inspection, etc. For example, the health quantifier calculator 410 can obtain the model inputs 335 based on executing one or more of the historical data model 450, the physics-based model 452, the stochastic model 454, the hybrid model 456, etc., using the calibrated asset sensor data. In such an example, the health quantifier calculator 410 can use the model inputs 335 that are the most restrictive or the health quantifier calculator 410 can use an average of one or more of the model inputs 335.

In some examples, the health quantifier calculator 410 uses the historical data model 450 to generate the model inputs 335. For example, the health quantifier calculator 410 can use the historical data model 450 to generate the model inputs 335 while the engine 102 is on-wing of an aircraft, while the engine 102 is fielded, prior to a maintenance inspection, etc. For example, the historical data model 450 can be a regression model or any other type of statistical model using asset monitoring information (e.g., historical asset monitoring information, etc.) based on the inputs 325, information stored in the database 345, the calibrated asset sensor data from the parameter tracker 405, etc. For example, the historical data model 450 can generate the model inputs 335 by performing a statistical analysis on previous workscope operations. For example, the historical data model 450 can obtain information corresponding to assets similar in asset configuration, asset class, environment, utilization, etc., to the engine 102. In such an example, the historical data model 450 can generate metrics and quantifiers that can be applied to the engine 102. For example, the historical data model 450 can calculate a percentage of useful life remaining, a quantity of flight cycles remaining, a quantity of TOW hours remaining, etc., for the engine 102 based on how similar assets (e.g., assets with a substantially similar asset configuration, asset class history, etc.) have previously performed (e.g., previously performed after completing a similar workscope, etc.).

In some examples, the health quantifier calculator 410 uses the physics-based model 452 to generate the model inputs 335. For example, the physics-based model 452 of the engine 102 can include one or more vibration models, stress models, thermo-mechanical models, aero-thermal models, aero-mechanical models, etc., of one or more sensors, asset components, etc., of the engine 102. For example, the health quantifier calculator 410 can use the physics-based model 452 to generate the model inputs 335 while the engine 102 is on-wing of an aircraft, while the engine 102 is fielded, prior to a maintenance inspection, etc. The example physics-based model 452 can be a digital twin model of the engine 102. For example, the digital twin model can simulate physics behavior, a thermodynamic health, a performance health, etc., of the engine 102 using asset monitoring information based on the inputs 325, information stored in the database 345, the calibrated asset sensor data from the parameter tracker 405, etc. For example, the physics-based model 452 can simulate inputs and outputs of the sensors 144, 146 of FIGS. 1-2 of the engine 102.

In some examples, the physics-based model 452 can simulate an operability of the engine 102 (e.g., an efficiency of the engine 102, etc.), a durability of the engine 102 (e.g., a mechanical stress on the fan section 108, the booster compressor 114, etc.), etc., based on simulating the engine 102 executing one or more flight cycles, flight legs, flight operations, etc. Thus, by evaluating and extrapolating from the physics-based model 452, asset characteristics can be identified and evaluated, and behavior and other outcomes associated with the asset (e.g., the engine 102, etc.) can be modeled and predicted, for example. For example, the health quantifier calculator 410 can extrapolate the model inputs 335 of FIG. 3 obtained from the physics-based model 452 to forecast and/or otherwise predict future issues likely to arise corresponding to the engine 102 because of the characteristics of the engine 102, a utilization of the engine 102, an operating environment of the engine 102, etc.

In some examples, the health quantifier calculator 410 uses the stochastic model 454 to generate metrics based on estimating probability distributions of potential outcomes by allowing for random variation in one or more inputs over time. For example, the health quantifier calculator 410 can use the stochastic model 454 to generate the model inputs 335 while the engine 102 is on-wing of an aircraft, while the engine 102 is fielded, prior to a maintenance inspection, etc. In some examples, the stochastic model 454 generates the random variation based on fluctuations observed in historical data (e.g., the model inputs 335 based on the historical data model 450, etc.), the asset monitoring information based on the inputs 325, the calibrated asset sensor data from the parameter tracker 405, etc., for a selected time period using time-series techniques. For example, the stochastic model 454 can calibrate the random variation to be within limits set forth by the outputs from the historical data model 450. In some examples, the stochastic model 454 includes generating continuous probability distributions (e.g., Weibull distributions, reliability curves, etc.) to determine a distribution of failure rates over time due to one or more asset components. For example, the stochastic model 454 can generate a failure rate of the engine 102 based on determining failure rates for the fan section 108, the booster compressor 114, etc., of the engine 102.

In some examples, the health quantifier calculator 410 uses the hybrid model 456 to generate the model inputs 335 using one or more of the historical data model 450, the physics-based model 452, and the stochastic model 454 of FIG. 4. For example, the health quantifier calculator 410 can use the hybrid model 456 to generate the model inputs 335 while the engine 102 is on-wing of an aircraft, while the engine 102 is fielded, prior to a maintenance inspection, etc. For example, the hybrid model 456 can be the stochastic model 454 in which the outputs from the stochastic model 454 are compared to the physics-based model 452 and the outputs are adjusted based on the comparison. In another example, the hybrid model 456 can be the stochastic model 454 in which the outputs from the stochastic model 454 can be compared to the historical data model 450 and the outputs are adjusted or calibrated based on the comparison.

In some examples, the health quantifier calculator 410 calculates an actual AHQ of an asset component based on actual AHQ of sub-components of the asset component while on-wing of an aircraft, while the asset component is fielded, prior to a maintenance inspection, etc. For example, the health quantifier calculator 410 can calculate an actual AHQ for the fan section 108 of FIG. 1 based on calculating an actual AHQ for sub-components of the fan section 108 based on the model inputs 335. For example, the health quantifier calculator 410 can calculate an actual AHQ of sub-components such as a fan blade, a bearing, a speed sensor, etc., of the fan section 108 by executing the physics-based model 452 of the engine 102. In such an example, the health quantifier calculator 410 can generate an actual AHQ of the fan section 108 based on calculating an average (e.g., a weighted average, etc.) of the actual AHQ of the fan blade, the bearing, the speed sensor, etc., of the fan section 108. In some examples, the health quantifier calculator 410 can rank the actual AHQ of the asset components (e.g., the fan section 108, the booster compressor 114, etc.) in an ascending order, a descending order, by criticality (e.g., a quantitative measure of how critical an asset component is to a function of the engine 102, etc.), etc.

In some examples, the health quantifier calculator 410 calculates projected AHQ based on the model inputs 335. In some examples, the projected AHQ represents what an actual AHQ of an asset component can be based on forecast operating conditions. For example, the health quantifier calculator 410 can calculate a projected AHQ for the booster compressor 114 of FIG. 1 based on an actual AHQ for the booster compressor 114 and generating the model inputs 335 based on a forecast utilization and environment plan 460. In some examples, the forecast utilization and environment plan 460 corresponds to future utilization (e.g., a number of flight cycles, flight legs, operation hours, etc.) and environments (e.g., ambient temperature ranges of 25-40 degrees Celsius, salt atmosphere percentage ranges of 15-35%, etc.) to be endured by the engine 102 in future operations.

For example, the health quantifier calculator 410 can calculate the projected AHQ for the booster compressor 114 by calculating a change in the actual AHQ over time based on the forecast utilization and environment plan 460. For example, the health quantifier calculator 410 can calculate a projected AHQ of 30% for the booster compressor 114 based on an actual AHQ of 70% for the booster compressor 114 and executing the models 450, 452, 454, 456 for an additional 500 flight cycles in a geographic region in which ambient temperatures range from 25-40 degrees Celsius and salt atmosphere percentages range of 15-35%.

In some examples, the health quantifier calculator 410 calculates a projected AHQ of an asset component based on a projected AHQ of sub-components of the asset component. For example, the health quantifier calculator 410 can calculate a projected AHQ for the fan section 108 of FIG. 1 based on calculating a projected AHQ for sub-components of the fan section 108 based on the model inputs 335. For example, the health quantifier calculator 410 can calculate a projected AHQ of sub-components such as a fan blade, a bearing, a speed sensor, etc., of the fan section 108 by executing the physics-based model 452 of the engine 102. In such an example, the health quantifier calculator 410 can generate a projected AHQ of the fan section 108 based on calculating an average (e.g., a weighted average, etc.) of the projected AHQ of the fan blade, the bearing, the speed sensor, etc., of the fan section 108. In some examples, the health quantifier calculator 410 can rank the projected AHQ of the asset components (e.g., the fan section 108, the booster compressor 114, etc.) in an ascending order, a descending order, by criticality (e.g., a quantitative measure of how critical an asset component is to a function of the engine 102, etc.), etc.

In some examples, the health quantifier calculator 410 deploys or directs a deployment of an automated (e.g., an unmanned, a computer-operated, etc.) imaging system to inspect the engine 102 to generate an AHQ. For example, the health quantifier calculator 410 can use an imaging system including one or more cameras (e.g., digital cameras, video cameras, etc.) to capture one or more images of an asset component of the engine 102. For example, the health quantifier calculator 410 can use an object-recognition system (e.g., a machine-learning system, a deep-learning system, etc.) to compare an image of the booster compressor 114 of FIG. 1 to an image in an object-recognition database. In some examples, the object-recognition system compares the images using an appearance-based method such as divide-and-conquer search, edge matching, greyscale matching, gradient matching, etc. In some examples, the object-recognition system compares the images using a feature-based method.

In some examples, the health quantifier calculator 410 calculates an AHQ of the booster compressor 114 based on the comparison of an image of the booster compressor 114 captured during an inspection process, a real-time operation, a maintenance period, etc., to an image stored in the object-recognition database. For example, the health quantifier calculator 410 can determine an AHQ of the booster compressor 114 by matching a captured image (e.g., matching a captured image within a specified object-recognition tolerance, etc.) of the booster compressor 114 with an unknown AHQ to an image stored in the object-recognition database with a known AHQ, and determining the AHQ based on the match.

In the illustrated example of FIG. 4, the FAHA 320 includes the recommendation generator 415 to generate workscope recommendations for an asset. For example, the recommendation generator 415 can generate a workscope recommendation for the engine 102 of FIG. 1 including maintenance operations, service operations, etc., for the engine 102. For example, the recommendation generator 415 can compare an AHQ (e.g., an actual AHQ, a projected AHQ, etc.) to an AHQ threshold (e.g., an actual AHQ threshold, a projected AHQ threshold, etc.) and determine whether the AHQ satisfies the AHQ threshold based on the comparison. The example recommendation generator 415 can generate a recommendation to perform maintenance on the engine 102, a component of the engine 102 (e.g., the fan section 108, the booster compressor 114, etc.), etc., based on whether the AHQ satisfies the AHQ threshold.

For example, the recommendation generator 415 can compare an actual AHQ of 50% useful life remaining of the fan section 108 to an actual AHQ threshold of 75% of the fan section 108. The example recommendation generator 415 can determine that the actual AHQ of 50% satisfies the actual AHQ threshold of 75% based on the actual AHQ being less than the actual AHQ threshold. For example, the recommendation generator 415 can generate an advisory action, a maintenance alert, a service recommendation, etc., to perform a maintenance operation (e.g., replacement, refurbishment, repair, etc.) on the fan section 108 based on the AHQ satisfying the actual AHQ threshold. In some examples, the recommendation generator 415 generates asset-level and fleet-level operation diagnostics, maintenance alerts, service recommendations, etc., to assess, summarize, visualize, etc., asset component level AHQ, asset-level AHQ, fleet-level AHQ, etc., to optimize and/or otherwise improve asset maintenance operations.

In the illustrated example of FIG. 4, the FAHA 320 includes the report generator 420 to generate and/or otherwise prepare a report to record recommended workscope plans. For example, the report generator 420 can generate a report including fleet-level actual AHQ, asset-level actual AHQ, asset component level actual AHQ, etc., corresponding to one or more assets and/or one or more operators. In another example, the report generator 420 can generate a report including fleet-level projected AHQ, asset-level projected AHQ, asset component level projected AHQ, etc., corresponding to one or more assets and/or one or more operators. In yet another example, the report generator 420 can generate a report including recommended workscopes targeting an operator, an asset owned by the operator, an asset component included in the asset, etc.

In some examples, the report generator 420 generates a report in response to user input. For example, a user of the FAHA 320 can generate a report at any time on-demand. In some examples, the report generator 420 generates (e.g., automatically generates, etc.) a report in response to an AHQ satisfying an AHQ threshold. For example, the report generator 420 can generate a report including a workscope recommendation for the booster compressor 114 of the engine 102 when an actual AHQ, a projected AHQ, etc., of the booster compressor 114 satisfies an actual AHQ threshold, a projected AHQ threshold, etc.

In some examples, the report generator 420 stores the report in the database 345. In some examples, the report generator 420 transmits the report to an operator, to a central facility, to a maintenance facility, to a supply chain support center, etc., via the network 330 of FIG. 3. In some examples, the report generator 420 displays the report on a display of a computing device via a web-based application, a smartphone-based application, etc.

In the illustrated example of FIG. 4, the health quantifier calculator 410, the recommendation generator 415, the report generator 420, and/or, more generally, the FAHA 320 generate outputs 470. In some examples, the outputs 470 include AHQ (e.g., actual AHQ, projected AHQ, an overall actual AHQ, an overall projected AHQ, etc.) of an asset (e.g., the engine 102, etc.), an asset component (e.g., the fan section 108, the booster compressor 114, etc.), a fleet of assets, etc. In some examples, the outputs 470 include a workscope recommendations of one or more assets and/or asset components targeted for a maintenance operation, a removal from service, etc. In some examples, the outputs 470 can include reports. For example, the outputs 470 can include a report including an asset (e.g., the engine 102, etc.) targeted for maintenance and corresponding AHQ of the asset and asset components (e.g. the fan section 108, the booster compressor 114, etc.) of the asset. For example, a report identifying the booster compressor 114 of the engine 102 as a target for maintenance can be transmitted to a supply chain operations center via the network 330 to direct supply chain personnel, supply chain computing systems or algorithms, etc., to purchase replacement parts and equipment to replace the booster compressor 114, to schedule removing the engine 102 from service, to identify a maintenance facility to complete the replacement, etc.

While an example implementation of the FAHA 320 of FIG. 3 is illustrated in FIG. 4, one or more of the elements, processes and/or devices illustrated in FIG. 4 may be combined, divided, re-arranged, omitted, eliminated, and/or implemented in any other way. Further, the example data collection engine 400, the example parameter tracker 405, the example health quantifier calculator 410, the example recommendation generator 415, the example report generator, and/or, more generally, the example FAHA 320 of FIG. 3 may be implemented by hardware, software, firmware and/or any combination of hardware, software and/or firmware. Thus, for example, any of the example data collection engine 400, the example parameter tracker 405, the example health quantifier calculator 410, the example recommendation generator 415, the example report generator, and/or, more generally, the example FAHA 320 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data collection engine 400, the example parameter tracker 405, the example health quantifier calculator 410, the example recommendation generator 415, and/or the example report generator is/are hereby expressly defined to include a non-transitory computer readable storage device or storage disk such as a memory, a digital versatile disk (DVD), a compact disk (CD), a Blu-ray disk, etc. including the software and/or firmware. Further still, the example FAHA 320 of FIG. 3 may include one or more elements, processes and/or devices in addition to, or instead of, those illustrated in FIG. 4, and/or may include more than one of any or all of the illustrated elements, processes, and devices.

Figure 5:
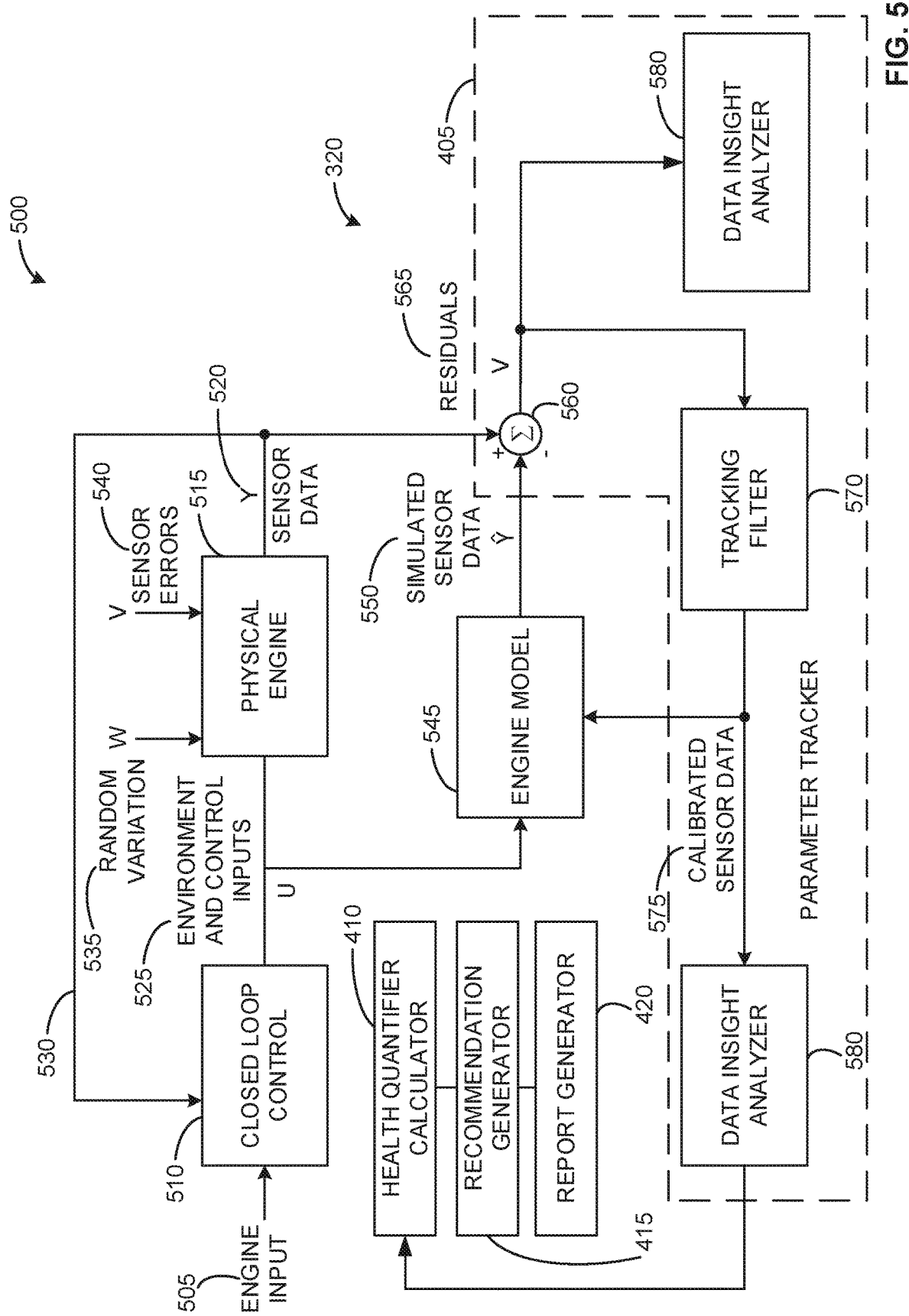
FIG. 5 is a block diagram of an example implementation of the example fielded asset health advisor apparatus of FIG. 4 executing a tracking filter system using data from the turbine engine of FIG. 1 and a digital twin model of the turbine engine of FIG. 1.

FIG. 5 is a block diagram of an example implementation of the example FAHA 320 executing a tracking filter system 500 using data (e.g., asset sensor data 430 of FIG. 4, etc.) from the engine 102 of FIG. 1 and the physics-based model 452 of FIG. 4 corresponding to the engine 102 to optimize and/or otherwise improve the physics-based model 452. In the illustrated example of FIG. 5, an engine input 505 is directed to a closed loop control module 510 to control a physical engine 515. The physical engine 515 generates sensor data 520 based on inputs 525 (e.g., environment and control inputs, etc.).

In the illustrated example of FIG. 5, the engine input 505 represents a control input to the physical engine 515. For example, the engine input 505 can be a command from a pilot, a command from an automated engine control system, etc., to control the engine 102. For example, the engine input 505 can correspond to the asset sensor data 430 of FIG. 4. In the illustrated example of FIG. 5, the closed loop control module 510 represents one or more control algorithms executed by the turbine engine controller 100 of FIGS. 1-2. For example, the closed loop control module 510 can calculate the control inputs 525 based on the engine input 505 and a feedback loop 530. For example, the closed loop control module 510 can correspond to the turbine engine controller 100 of FIGS. 1-2. The environment inputs 525 of the illustrated example represent environmental factors experienced by the physical engine 515. For example, the environment inputs 525 can include an ambient temperature of the engine 102 when in a parked flight segment, a taking off flight segment, etc. In another example, the environment inputs 525 can be an airborne particulate matter, a salt atmosphere content, a humidity atmosphere content, etc.

In the illustrated example of FIG. 5, the physical engine 515 represents a physical (e.g., an actual, etc.) turbine engine executing a turbine engine operation (e.g., turning a rotor blade at a specified rate, etc.) in response to receiving the environment and control inputs 525. For example, the physical engine 515 can correspond to the engine 102 of FIG. 1. The physical engine 515 of the illustrated example generates the sensor data 520 based on random variation 535 and sensor errors 540. The sensor data 520 of the illustrated example represents asset sensor data obtained from the sensors 144, 146 of FIGS. 1-2. For example, the sensor data 520 can correspond to the asset sensor data 430 of FIG. 4. In some examples, the sensor data 520 corresponds the asset sensor data 430 when the engine 102 is in a steady-state flight segment such as a cruising flight segment. In some examples, the sensor data 520 corresponds to the asset sensor data 430 when the engine 102 is in a transient flight segment such as a transition between a climbing flight segment and the cruising flight segment.

The random variation 535 of the illustrated example of FIG. 5 represents variation in asset component operation of the physical engine 515. For example, the high-pressure turbine 120 of FIG. 1 can operate within a tolerance of 10 PSI, 25 PSI, 50 PSI, etc., due to random environment or operating characteristics of the high-pressure turbine 120 and/or the engine 102. The sensor errors 540 of the illustrated example represent a variation in a sensor measurement of a condition to the condition. For example, the sensor errors 540 can be a variation in a thermocouple device, a piezoelectric crystal, an integrated circuit chip electrical characteristic, etc., of the sensors 144, 146. In another example, the sensor errors 540 can be an offset due to an improper calibration, an out-of-date calibration, etc., of the sensors 144, 146.

In the illustrated example of FIG. 5, the tracking filter system 500 includes an engine model 545 to simulate the physical engine 515. For example, the engine model 545 can be the historical data model 450, the physics-based model 452, the stochastic model 454, the hybrid model 456, etc., of FIG. 4. The engine model 545 of the illustrated example generates simulated sensor data 550 based on the environment and control inputs 525 and calibrated sensor data 575. The simulated sensor data 550 of the illustrated example can correspond to the model inputs 335 of FIGS. 3-4. For example, the engine model 545 can generate predicted values for the sensor data 520 based on executing one or more of the models 450, 452, 454, 456 of FIG. 4. For example, the engine model 545 can generate the simulated sensor data 550 to represent a simulation of the sensor data 520 based on similar (e.g., substantially similar, a similar value within a tolerance, etc.) inputs (e.g., the environment and control inputs 525, etc.) and adjusted simulated sensor data (e.g., the calibrated sensor data 575, etc.). For example, the engine model 545 can generate the simulated sensor data 550 corresponding to a temperature sensor by simulating an ambient temperature substantially similar to an ambient temperature experienced by the engine 102 within a tolerance of 0.5 degrees Rankine.

In the illustrated example of FIG. 5, the tracking filter system 500 includes the parameter tracker 405 of FIG. 5 to compare the sensor data 520 to the simulated sensor data 550. In the illustrated example of FIG. 5, the parameter tracker 405 includes a difference calculator 560 to calculate a difference between the sensor data 520 and the simulated sensor data 550 to generate residuals 565. For example, the residuals 565 can be a difference between a temperature sensor measurement obtained from the sensors 144, 146 of FIGS. 1-2 and a simulated temperature sensor measurement corresponding to the sensors 144, 146. The residuals 565 of the illustrated example can be directed, transmitted, etc., to the recommendation generator 415 to generate a workscope recommendation based on the residuals 565.

In the illustrated example of FIG. 5, the parameter tracker 405 includes a tracking filter 570 to generate calibrated sensor data 575. For example, the tracking filter 570 can be a classical observer, an inverse Jacobian tracking filter, a least-squares tracking filter, a Kalman Filter (optimal observer), etc. In the illustrated example of FIG. 5, the parameter tracker 405 uses the tracking filter 570 to generate the calibrated sensor data 575 based on steady-state information, transient information, etc., and/or a combination thereof.

In some examples, the tracking filter 570 is a Kalman filter. In such examples, the tracking filter 570 assigns a tracking filter adjustment factor such as a Gaussian white noise parameter to each measurement (e.g., each input, each output, etc.). For example, the tracking filter adjustment factor can correspond to a standard deviation of Gaussian white noise. For example, if the tracking filter 570 assigns a Gaussian white noise standard deviation of zero to a measurement, then the measurement can correspond to an exact value of the measurement without noise. In another example, if the tracking filter 570 assigns a Gaussian white noise standard deviation of infinite standard deviations, then the tracking filter 570 can ignore the measurement.

In some examples, the tracking filter 570 assigns a value for a Gaussian white noise standard deviation to smooth asset parameters based on transient asset information. For example, the engine model 545 can generate a first efficiency of 0.8 for the low-pressure turbine 124 of FIG. 1 during the climb flight segment 640 using a climb flight segment model (e.g., the engine model 545 simulating the engine 102 while in the climb flight segment 640, etc.). In such an example, the engine model 545 can generate a second efficiency of 1.2 for the low-pressure turbine 124 during the cruise flight segment 650 using a cruise flight segment model (e.g., the engine model 545 simulating the engine 102 while in the cruise flight segment 650, etc.).

In some examples, however, the first and the second efficiencies should be comparable to simulate real-time operation of the engine 102. To reduce the difference between the first and the second efficiencies, the example tracking filter 570 can add a value for the Gaussian white noise standard deviation to the first efficiency to yield the second efficiency. For example, the tracking filter 570 can determine the second efficiency as a sum of the first efficiency and the value for the Gaussian white noise standard deviation. The example tracking filter 570 can generate the calibrated sensor data 575 based on the value for the Gaussian white noise standard deviation, which, in turn, can direct the engine model 545 to generate more accurate simulated sensor data 550.

In some examples, the tracking filter system 500 can be executed using steady-state information (e.g., steady-state sensor data, steady-state simulated sensor data, etc.) corresponding to information obtained from the engine 102 when the engine 102 is operating in a steady-state flight segment (e.g., operating in a cruising segment, etc.). In some examples, the tracking filter system 500 can be executed using transient information (e.g., transient sensor data, transient simulated sensor data, etc.) corresponding to information obtained from the engine 102 when the engine 102 is transitioning flight segments (e.g., transitioning from the climbing flight segment to the cruising flight segment, etc.). For example, the tracking filter 570 can obtain the sensor data 520, the simulated sensor data 550, the residuals 565, etc., based on the physical engine 515 operating in a steady-state, a transient state, etc., and the engine model 545 simulating the physical engine 515 operating in the steady-state, the transient state, etc.

For example, the tracking filter 570 can obtain the sensor data 520, the simulated sensor data 550, etc., based on the physical engine 515 operating in a steady-state and the engine model 545 simulating the physical engine 515 operating in the steady-state. In another example, the tracking filter 570 can obtain the sensor data 520, the simulated sensor data 550, etc., based on the physical engine 515 operating in a transient state and the engine model 545 simulating the physical engine 515 operating in the transient state.

In some examples, the parameter tracker 405 directs the tracking filter 570 to select tracking filter data to be processed. For example, the tracking filter 570 can select the tracking filter data to include the sensor data 520, the simulated sensor data 550, etc., corresponding to the physical engine 515 and the engine model 545 in a steady-state. In another example, the tracking filter 570 can select the tracking filter data to include the sensor data 520, the simulated sensor data 550, etc., corresponding to the physical engine 515 and the engine model 545 in a transient state. In yet another example, the tracking filter 570 can select the tracking filter data to include a combination of the sensor data 520, the simulated sensor data 550, etc., corresponding to (1) the physical engine 515 and the engine model 545 in the steady-state and (2) the physical engine 515 and the engine model 545 in the transient state.

In some examples, the calibrated sensor data 575 includes adjusted states and parameters of an asset, an asset component, etc., simulated by the engine model 545. For example, the calibrated sensor data 575 can include an adjusted simulated temperature sensor measurement based on comparing the simulated temperature sensor measurement included in the simulated sensor data 550 to the temperature sensor measurement included in the sensor data 520.

In the illustrated example of FIG. 5, the parameter tracker 405 includes a data insight analyzer 580 to evaluate changes in the residuals 565, the calibrated sensor data 575, etc., over time. For example, the data insight analyzer 580 can transmit trend information to the health quantifier calculator 410 of FIG. 4. In some examples, the data insight analyzer 580 detects changepoint type shifts after maintenance or operation events (e.g., a water wash of the engine 102, a debris ingestion of the engine 102, etc.). In some examples, the data insight analyzer 580 determines correlations between parameters (e.g., a correlation between a first and a second transient asset parameter, etc.), performs data comparisons, calculates differences between parameter values for the engine 102 compared to fleet parameter values, etc. In some examples, the data insight analyzer 580 identifies non-responsive or failing sensors based on executing the tracking filter 570. In some examples, the data insight analyzer 580 identifies potential non-responsive or potential failing sensors by identifying slow drifts in sensor values, sudden shifts in sensor values, etc. In such examples, the data insight analyzer 580 can direct the parameter tracker 405 to remove, isolate, prevent, etc., the identified non-responsive sensors or the identified potential non-responsive sensors from being used by the tracking filter 570.

In some examples, the health quantifier calculator 410 adjusts a calculation of an AHQ based on a trend analysis (e.g., an increase in the residuals 565 over time, a decrease in the calibrated sensor data 575 over time, etc.) of the calibrated sensor data 575 obtained from the data insight analyzer 580. In some examples, the recommendation generator 415 generates a workscope recommendation for the engine 102 based on a trend analysis of the calibrated sensor data 575 and the report generator 420 can generate a report including the workscope recommendation and the trend analysis of the calibrated sensor data 575.

Figure 6:
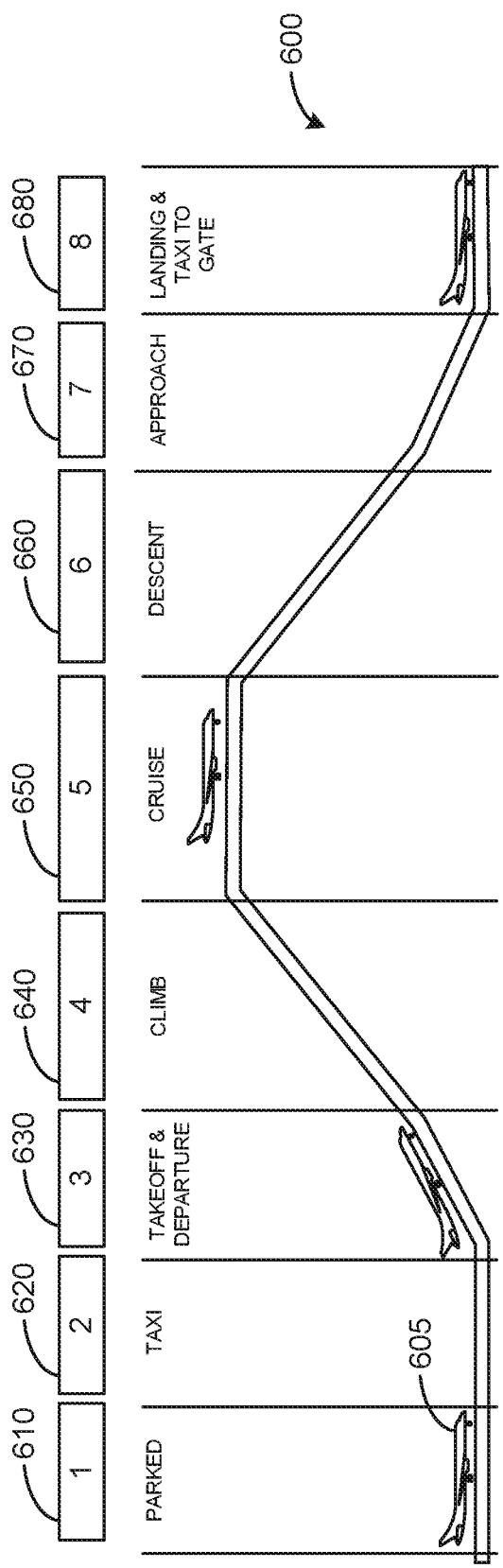
FIG. 6 is a schematic illustration of example flight segments in which the turbine engine of FIG. 1 can be used.

In the illustrated example of FIG. 5, the example tracking filter system 500 includes the tracking filter 570 to compare the simulated sensor data 550 generated by the engine model 545 to the sensor data 520 generated by the physical engine 515 to optimize and/or otherwise improve the engine model 545. For example, the engine model 545 can adjust (e.g., iteratively adjust, etc.) one or more physics-based calculations, regression or statistical calculations, etc., based on the calibrated sensor data 575. For example, the engine model 545 can generate the simulated sensor data 550 to match the sensor data 520 more accurately based on the calibrated sensor data 575. FIG. 6 is a schematic illustration of example flight segments of a flight route 600 in which the turbine engine 102 of FIG. 1 can be used. In the illustrated example, the engine 102 can be coupled to an aircraft 605. The flight route 600 of the illustrated example includes a parked flight segment 610, a taxi flight segment 620, a takeoff and departure flight segment 630, a climb flight segment 640, a cruise flight segment 650, a descent flight segment 660, an approach flight segment 670, and a landing and taxi to gate flight segment 680. Additionally or alternatively, there may be fewer or more flight segments in the flight route 600.

In the example flight route 600, the engine 102 experiences steady-state and transient flight segments. For example, one or more of the parked flight segment 610, the taxi flight segment 620, the cruise flight segment 650, and the landing and taxi to gate flight segment 680 can correspond to a steady-state flight segment. In another example, one or more of the takeoff and departure flight segment 630, the climb flight segment 640, the descent flight segment 660, and the approach flight segment 670 can correspond to a transient flight segment. In some examples, the engine 102 generates steady-state asset data (e.g., steady-state asset sensor data, etc.) when the engine 102 is not transitioning between flight segments. For example, the engine 102 can generate steady-state asset sensor data when the engine 102 is in the parked flight segment 610, the taxi flight segment 620, the cruise flight segment 650, etc., and does not transition to another flight segment. For example, the engine 102 can generate (e.g., iteratively generate, etc.) steady-state asset sensor data when the engine 102 is operating in the cruise flight segment 650 and does not transition to the descent flight segment 660.

In some examples, the engine 102 generates transient asset data (e.g., transient asset sensor data, etc.) when the engine 102 is transitioning between flight segments. For example, the engine 102 can generate transient asset sensor data when the engine 102 is transitioning from the taxi flight segment 620 to the takeoff and departure flight segment 630, transitioning from the climb flight segment 640 to the cruise flight segment 650, etc. For example, the engine 102 can generate (e.g., iteratively generate, etc.) transient asset sensor data when the engine 102 is operating in a transition period between the cruise flight segment 650 and the descent flight segment 660.

Flowcharts representative of example machine readable instructions for implementing the example FAHA 320 of FIGS. 3-5 are shown in FIGS. 7-10. In these examples, the machine readable instructions comprise a program for execution by a processor such as a processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIGS. 7-10, many other methods of implementing the example FAHA 320 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 7-10 may be implemented using coded instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open ended in the same manner as the term "comprising" and "including" are open ended.

Figure 7:
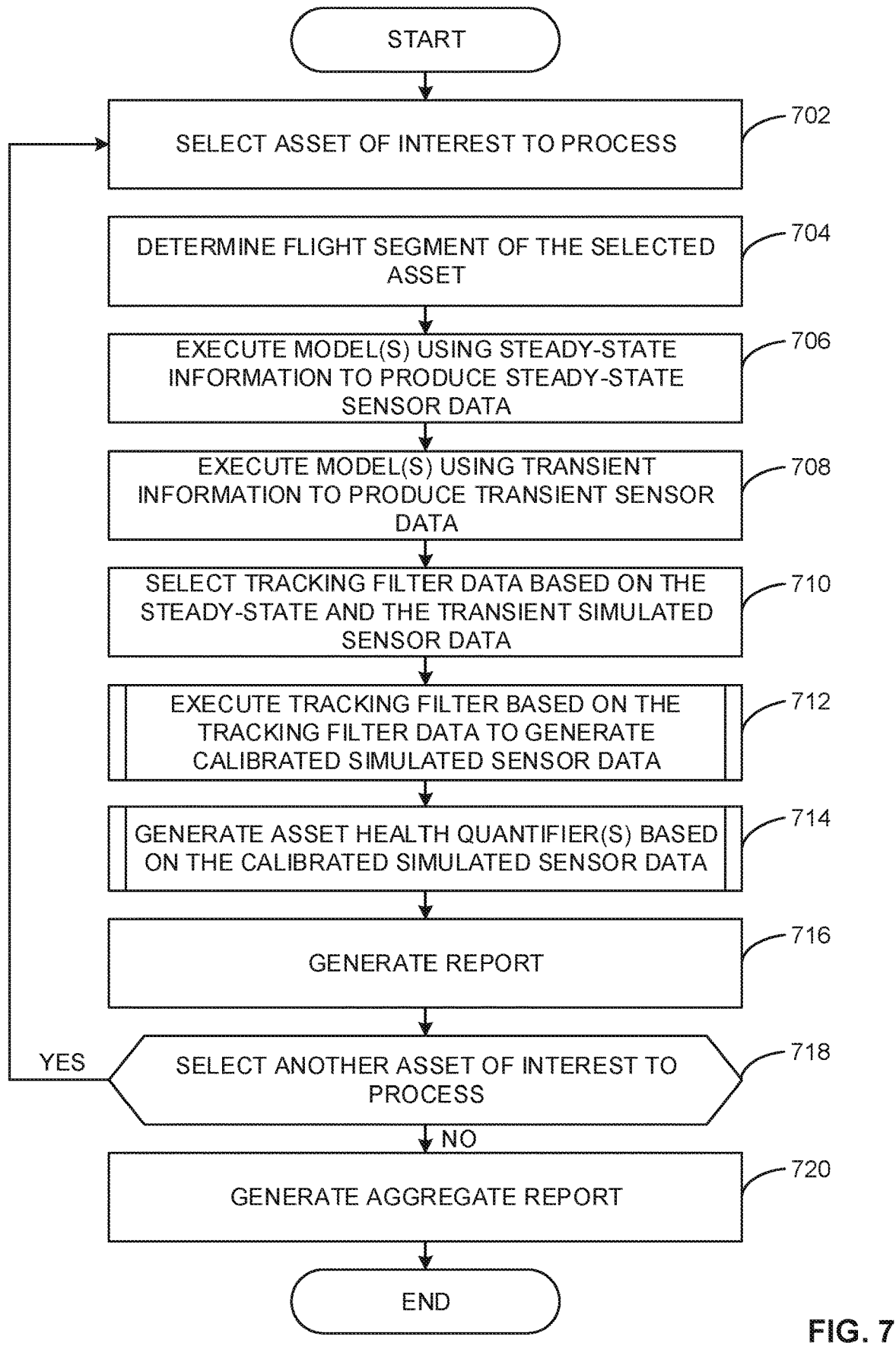
FIGS. 7-10 are flowcharts representative of example methods that can be executed by the example asset workscope generation system of FIG. 3 and/or the example fielded asset health advisor apparatus of FIGS. 3-5 to implement the examples disclosed herein.

FIG. 7 is a flowchart representative of an example method that can be performed by the example FAHA 320 of FIGS. 3-5 to generate a report corresponding to a workscope of the engine 102. The example method begins at block 702 at which the example FAHA 320 selects an asset of interest to process. For example, the data collection engine 400 of FIG. 4 can select the engine 102 of FIG. 1.

At block 704, the example FAHA 320 determines a flight segment of the selected asset. For example, the data collection engine 400 can determine that the engine 102 is coupled to an aircraft operating in the cruising flight segment 650. For example, the data collection engine 400 can obtain information from the engine 102 while the engine 102 is in operation. At block 706, the example FAHA 320 executes model(s) using steady-state information to produce steady-state sensor data. For example, the parameter tracker 405 can direct the physics-based model 452 of FIG. 4 to generate the model inputs 335 of FIGS. 3-4 using steady-state simulated asset sensor data. In another example, the parameter tracker 405 can direct the engine model 545 of FIG. 5 to generate the simulated sensor data 550 of FIG. 5 using steady-state information based on the environment and control inputs 525 of FIG. 5.

At block 708, the example FAHA 320 executes model(s) using transient information to produce transient sensor data. For example, the parameter tracker 405 can direct the physics-based model 452 of FIG. 4 to generate the model inputs 335 of FIGS. 3-4 using transient simulated asset sensor data. In another example, the parameter tracker 405 can direct the engine model 545 of FIG. 5 to generate the simulated sensor data 550 of FIG. 5 using transient information based on the environment and control inputs 525 of FIG. 5.

At block 710, the example FAHA 320 selects tracking filter data based on the steady-state and the transient simulated sensor data. For example, the parameter tracker 405 can use the tracking filter 570 of FIG. 5 to select the tracking filter data to include the steady-state simulated sensor data, the transient simulated sensor data, etc., and/or a combination thereof.

At block 712, the example FAHA 320 executes a tracking filter based on the tracking filter data to generated calibrated simulated sensor data. For example, the parameter tracker 405 can execute the tracking filter 570 to generate the calibrated sensor data 575 of FIG. 5. An example process that can be used to implement block 712 is described below in connection with FIG. 8.

At block 714, the example FAHA 320 generates asset health quantifier(s) based on the calibrated simulated sensor data. For example, the health quantifier calculator 410 can generate an actual AHQ, a projected AHQ, etc., of the engine 102 based on the physics-based model 452 generating simulated asset sensor data (e.g., steady-state simulated asset sensor data, transient simulated asset sensor data, etc.) based on calibrated simulated sensor data (e.g., the calibrated sensor data 575 of FIG. 5, etc.). For example, the health quantifier calculator 410 can generate an AHQ of the engine 102 while the engine 102 is in operation. By generating an AHQ of the engine 102 while in service, the FAHA 320 can identify potential maintenance tasks prior to an inspection of the engine 102 and, thus, increase aircraft operator visibility of the engine 102 asset health. Example processes that can be used to implement block 714 are described below in connection with FIGS. 9-10.

At block 716, the example FAHA 320 generates a report. For example, the report generator 420 can generate a report including recommended workscopes targeting the engine 102, an operator of the engine 102, etc. For example, the report generator 420 can generate a report while the engine 102 is in operation and, thus, enabling greater visibility of the engine 102 asset health prior to performing an inspection of the engine 102. At block 718, the example FAHA 320 determines whether to select another asset of interest to process. For example, the data collection engine 400 can determine to select another turbine engine to process.

If, at block 718, the example FAHA 320 determines to select another asset of interest to process, control returns to block 702 to select another asset of interest to process. If, at block 718, the example FAHA 320 determines not to select another asset of interest to process, then, at block 720, the FAHA 320 generates an aggregate report. For example, the report generator 420 can generate a report including recommended workscopes targeting a plurality of assets for an operator, a plurality of operators, etc. For example, the report generator 420 can generate a report including recommended workscopes for 20 turbine engines owned and operated by one aircraft operator. In another example, the report generator 420 can generate a report including recommended workscopes for 200 turbine engines owned and operated by 10 aircraft operators. In response to the example FAHA 320 generating the aggregate report, the example method concludes.

Figure 8:
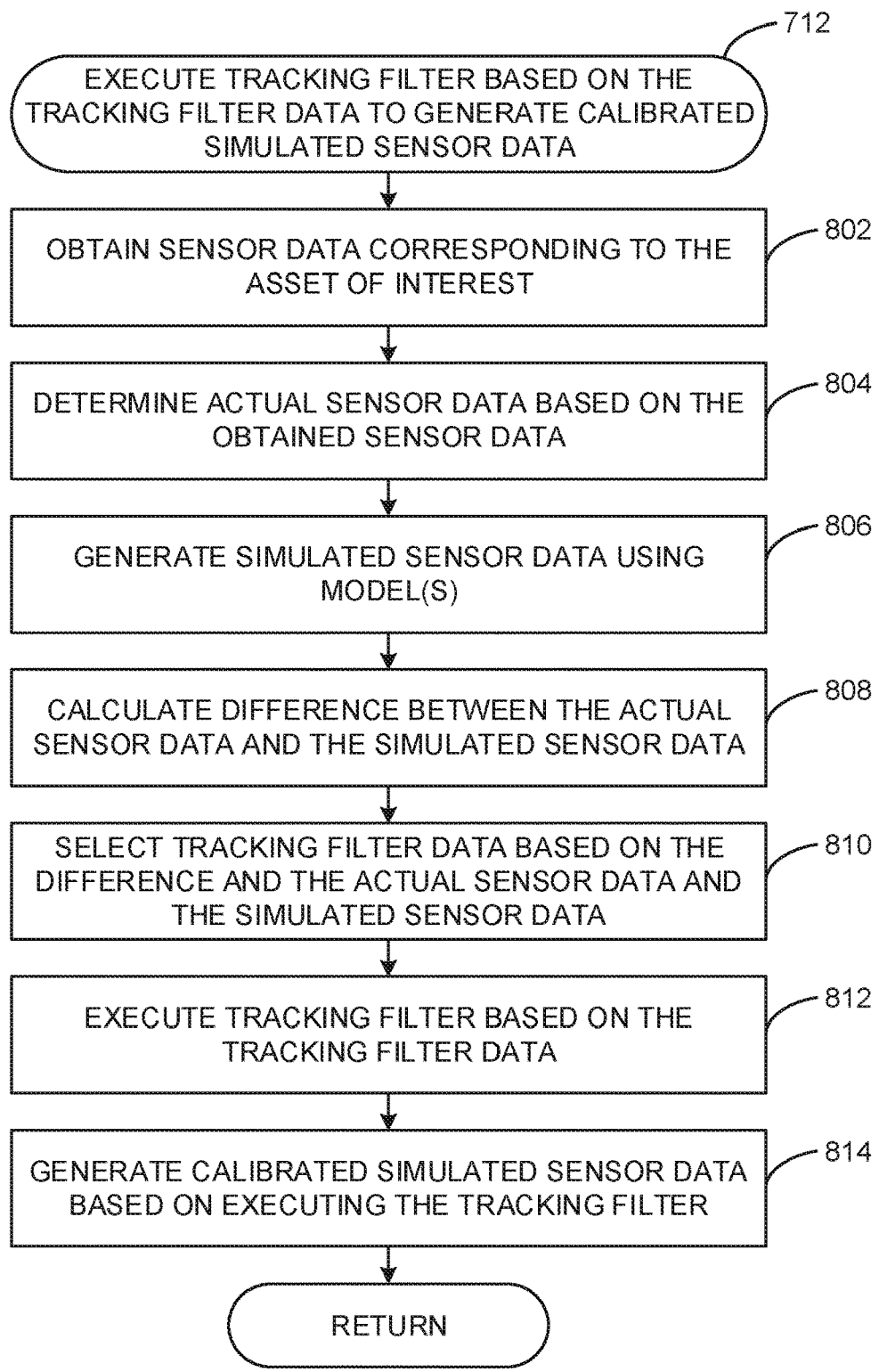

FIG. 8 is a flowchart representative of an example method that can be performed by the example FAHA 320 of FIGS. 3-5 to execute a tracking filter based on the tracking filter data to generate calibrated simulated sensor data. The example process of FIG. 8 can be used to implement the operation of block 712 of FIG. 7. The example method begins at block 802 at which the example FAHA 320 obtains sensor data corresponding to the asset of interest. For example, the data collection engine 400 of FIG. 4 can obtain the asset sensor data 430 of FIG. 4 corresponding to the engine 102 of FIG. 1 while the engine 102 is in operation.

At block 804, the example FAHA 320 determines actual sensor data based on the obtained sensor data. For example, the parameter tracker 405 can obtain the sensor data 520 based on the physical engine 515 responding to the environment and control inputs 525, the random variation 535, and the sensor errors 540 of FIG. 5.

At block 806, the example FAHA 320 generates simulated sensor data using model(s). For example, the parameter tracker 405 can direct the engine model 545 to generate the simulated sensor data 550 of FIG. 5. For example, the parameter tracker 405 can direct the engine model 545 to generate the simulated sensor data 550 while the engine 102 is in operation.

At block 808, the example FAHA 320 calculates a difference between the actual sensor data and the simulated sensor data. For example, the parameter tracker 405 can direct the difference calculator 560 to calculate a difference between the sensor data 520 and the simulated sensor data 550 of FIG. 5.

At block 810, the example FAHA 320 selects tracking filter data base on the difference and the actual sensor data and the simulated sensor data. For example, the parameter tracker 405 can select the tracking filter data to include steady-state actual sensor data, steady-state simulated sensor data, etc. For example, the parameter tracker 405 can determine to select steady-state asset data compared to transient asset data based on the difference. In another example, the parameter tracker 405 can determine to select a combination of steady-state asset data and transient asset data based on the difference.

At block 812, the example FAHA 320 executes a tracking filter based on the tracking filter data. For example, the parameter tracker 405 can execute the tracking filter 570 of FIG. 5 based on the steady-state asset data, the transient asset data, etc., and/or a combination thereof. At block 814, the example FAHA 320 generates calibrated simulated sensor data based on executing the tracking filter. For example, the parameter tracker 405 can use the tracking filter 570 of FIG. 5 to generate the calibrated sensor data 575 of FIG. 5 to optimize and/or otherwise improve the engine model 545 of FIG. 5 to be used by the health quantifier calculator 410, and/or, more generally, the FAHA 320 to generate more accurate AHQ. In response to generating the calibrated simulated sensor data based on executing the tracking filter, the example method returns to block 714 of the example of FIG. 7 to generate asset health quantifier(s) based on the calibrated sensor data.

Figure 9:
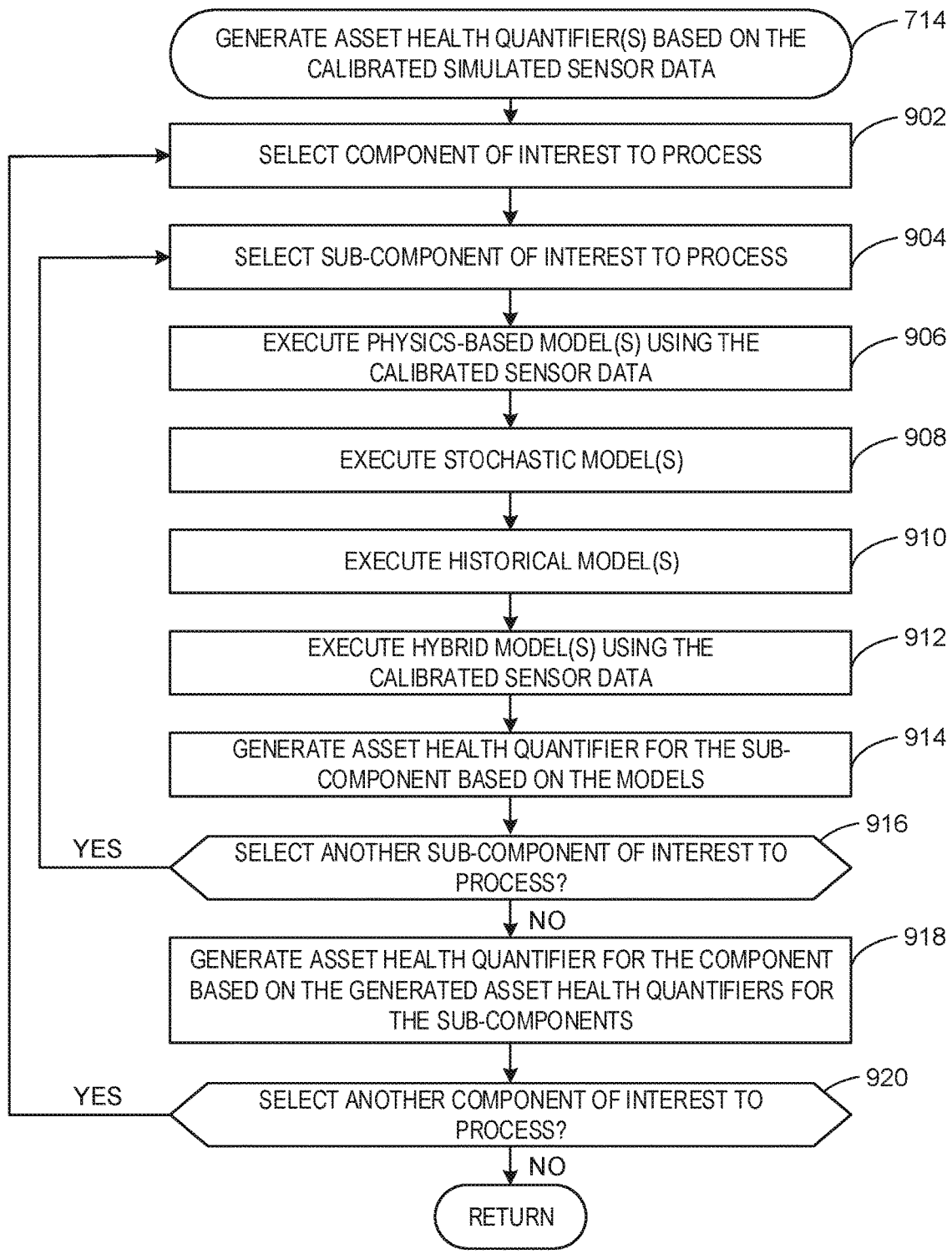

FIG. 9 is a flowchart representative of an example method that can be performed by the example FAHA 320 of FIGS. 3-5 to generate asset health quantifier(s) based on the calibrated simulated sensor data. The example process of FIG. 9 can be used to implement the operation of block 714 of FIG. 7. The example method begins at block 902 at which the example FAHA 320 selects a component of interest to process. For example, the data collection engine 400 can select the fan section 108 of FIG. 1 to process while the fan section 108 is in operation. At block 904, the example FAHA 320 selects a sub-component of interest to process. For example, the data collection engine 400 can select a fan blade of the fan section 108 to process.

At block 906, the example FAHA 320 executes physics-based model(s) using the calibrated simulated sensor data with respect to the sub-component of interest. For example, the health quantifier calculator 410 can execute the physics-based model 452 of FIG. 4 to simulate an operation of the fan blade of the fan section 108 using the calibrated sensor data 575 of FIG. 5 while the fan section 108 is in operation. At block 908, the example FAHA 320 executes stochastic model(s) with respect to the sub-component of interest. For example, the health quantifier calculator 410 can execute the stochastic model 454 of FIG. 4 to estimate a failure rate of the fan blade of the fan section 108 using a continuous probability distribution.

At block 910, the example FAHA 320 executes historical model(s) with respect to the sub-component of interest. For example, the health quantifier calculator 410 can execute the historical data model 450 of FIG. 4 to estimate a failure rate of the fan blade of the fan section 108 using historical data collected for fan blades operating on similar (e.g., substantially similar, etc.) assets as the engine 102.

At block 912, the example FAHA 320 executes hybrid model(s) using the calibrated simulated sensor data with respect to the sub-component of interest. For example, the health quantifier calculator 410 can execute the hybrid model 456 to estimate a failure rate of the fan blade of the fan section using the stochastic model 454 and comparing an output of the stochastic model 454 to an output of the physics-based model 452 using the calibrated sensor data 575 of FIG. 5, the historical data model, etc., and/or a combination thereof.

At block 914, the example FAHA 320 generates an asset health quantifier for the sub-component. For example, the health quantifier calculator 410 can calculate an actual AHQ for the fan blade of the fan section 108 based on the model inputs 335 while the fan blade of the fan section 108 is in operation. At block 916, the example FAHA 320 determines whether to select another sub-component of interest to process. For example, the data collection engine 400 can determine to select a bearing of the fan section 108 to process.

If, at block 916, the example FAHA 320 determines to select another sub-component of interest to process, control returns to block 704 to select another sub-component of interest to process. If, at block 916, the example FAHA 320 determines not to select another sub-component of interest to process, then, at block 918, the FAHA 320 generates an asset health quantifier for the component based on the generated asset health quantifiers for the sub-components. For example, the health quantifier calculator 410 can generate an actual AHQ for the fan section 108 based on actual AHQ of the sub-components (e.g., the fan blade, the bearing, etc.) of the fan section 108 while the fan section 108 is in operation.

At block 920, the example FAHA 320 determines whether to select another component of interest to process. For example, data collection engine 400 can determine to select the booster compressor 114 of FIG. 1 to process. If, at block 920, the example FAHA 320 determines to select another component of interest to process, control returns to block 902 to select another component of interest to process, otherwise the example method returns to block 716 of the example of FIG. 7 to generate a report.

Figure 10:
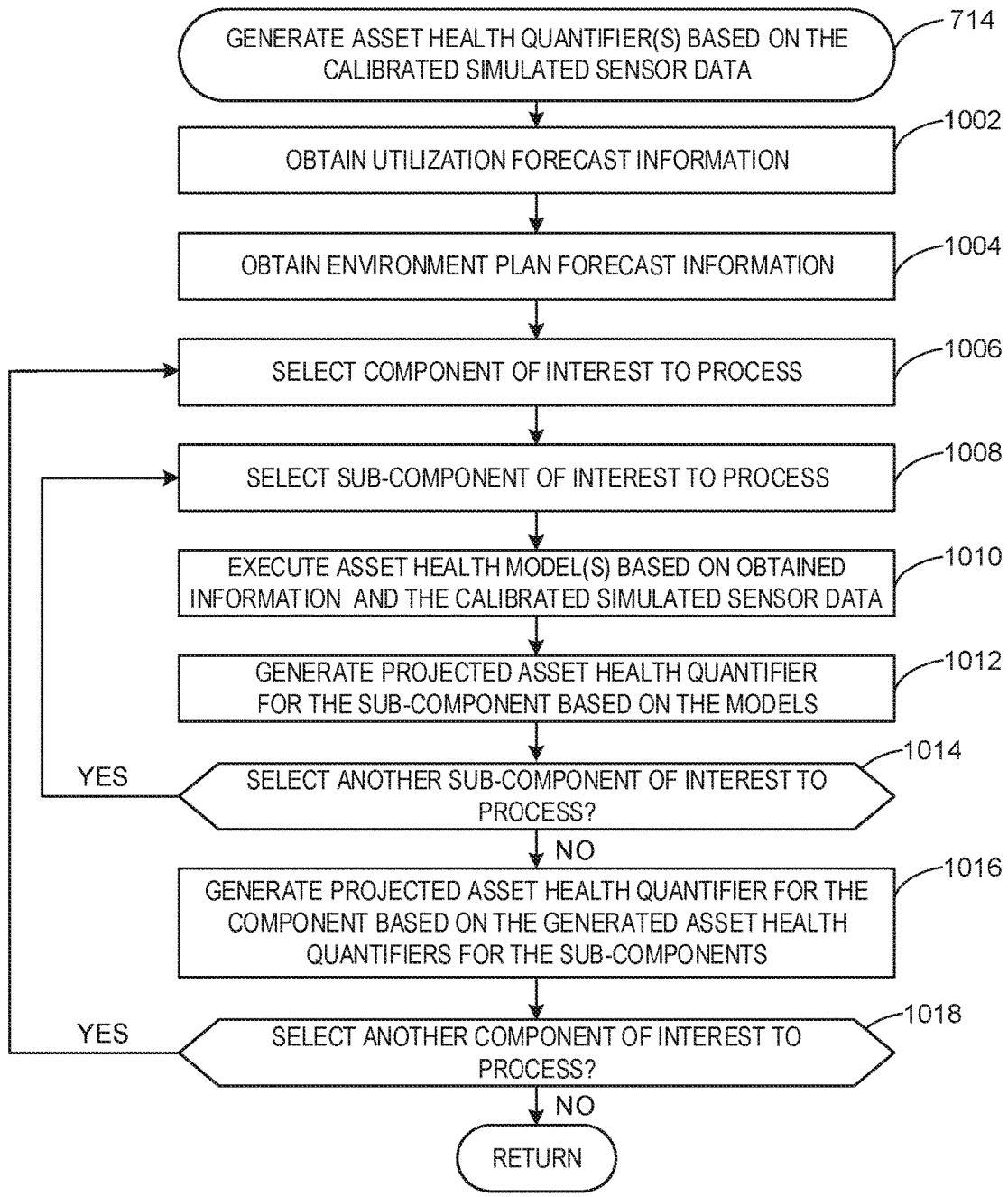

FIG. 10 is a flowchart representative of an example method that can be performed by the example FAHA 320 of FIGS. 3-5 to generate asset health quantifier(s) based on the calibrated simulated sensor data. For example, the method of FIG. 10 can be performed by the FAHA 320 to generate projected asset health quantifier(s) based on the calibrated sensor data. The example process of FIG. 10 can be used to implement the operation of block 714 of FIG. 7. The example method begins at block 1002 at which the example FAHA 320 obtains utilization forecast information. For example, the data collection engine 400 can obtain the forecast utilization and environment plan 460 of FIG. 4 for the engine 102.

At block 1004, the example FAHA 320 obtains environment plan forecast information. For example, the data collection engine 400 can obtain the forecast utilization and environment plan 460 for the engine 102. At block 1006, the example FAHA 320 selects a component of interest to process. For example, the data collection engine 400 can select the fan section 108 of FIG. 1 to process.

At block 1008, the example FAHA 320 selects a sub-component of interest to process. For example, the data collection engine 400 can select a fan blade of the fan section 108 to process. At block 1010, the example FAHA 320 executes asset health model(s) based on obtained information and the calibrated simulated sensor data. For example, the health quantifier calculator 410 can execute one or more of the historical data model 450, the physics-based model 452, the stochastic model 454, the hybrid model 456, etc., using the forecast utilization and environment plan 460 for the engine 102 and the calibrated sensor data 575 of FIG. 5 while the engine 102 is in operation. For example, the health quantifier calculator 410 can execute the physics-based model 452 to generate the simulated sensor data 550 of FIG. 5 based on the calibrated sensor data 575 of FIG. 5.

At block 1012, the example FAHA 320 generates a projected asset health quantifier for the sub-component based on the models. For example, the health quantifier calculator 410 can generate a projected asset health quantifier for the fan blade of the fan section 108 based on executing one or more of the models 450, 452, 454, 456 of FIG. 4 while the fan blade is in operation. At block 1014, the example FAHA 320 determines whether to select another sub-component of interest to process. For example, the data collection engine 400 can determine to select a bearing of the fan section 108 to process. For example, the data collection engine 400 can determine to select the bearing of the fan section 108 based on comparing the fan section 108 to a configuration file, a part list, etc., in the database 345 of FIGS. 3-4. For example, the data collection engine 400 can map the fan section 108 to the configuration file and determine a list of components included in the fan section 108 based on the mapping. For example, the data collection engine 400 can determine whether the bearing has not been processed based on comparing components of the fan section 108 already processed to components defined in the configuration file, the part list, etc., for the fan section 108 that has not been processed.

If, at block 1014, the example FAHA 320 determines to select another sub-component of interest to process, control returns to block 1008 to select another sub-component of interest to process. If, at block 1014, the example FAHA 320 determines not to select another sub-component of interest to process, then, at block 1016, the FAHA 320 generates a projected asset health quantifier for the component based on the generated asset health quantifiers for the sub-components. For example, the health quantifier calculator 410 can generate a projected AHQ for the fan section 108 based on projected AHQ of the sub-components (e.g., the fan blade, the bearing, etc.) of the fan section 108 while the fan section 108 is in operation.

At block 1018, the example FAHA 320 determines whether to select another component of interest to process. For example, the data collection engine 400 can determine to process the low-pressure turbine 124 of FIG. 1. If, at block 1018, the example FAHA 320 determines to select another component of interest to process, control returns to block 1006 to select another component of interest to process, otherwise the example method returns to block 716 of the example of FIG. 7 to generate a report.

Figure 11:
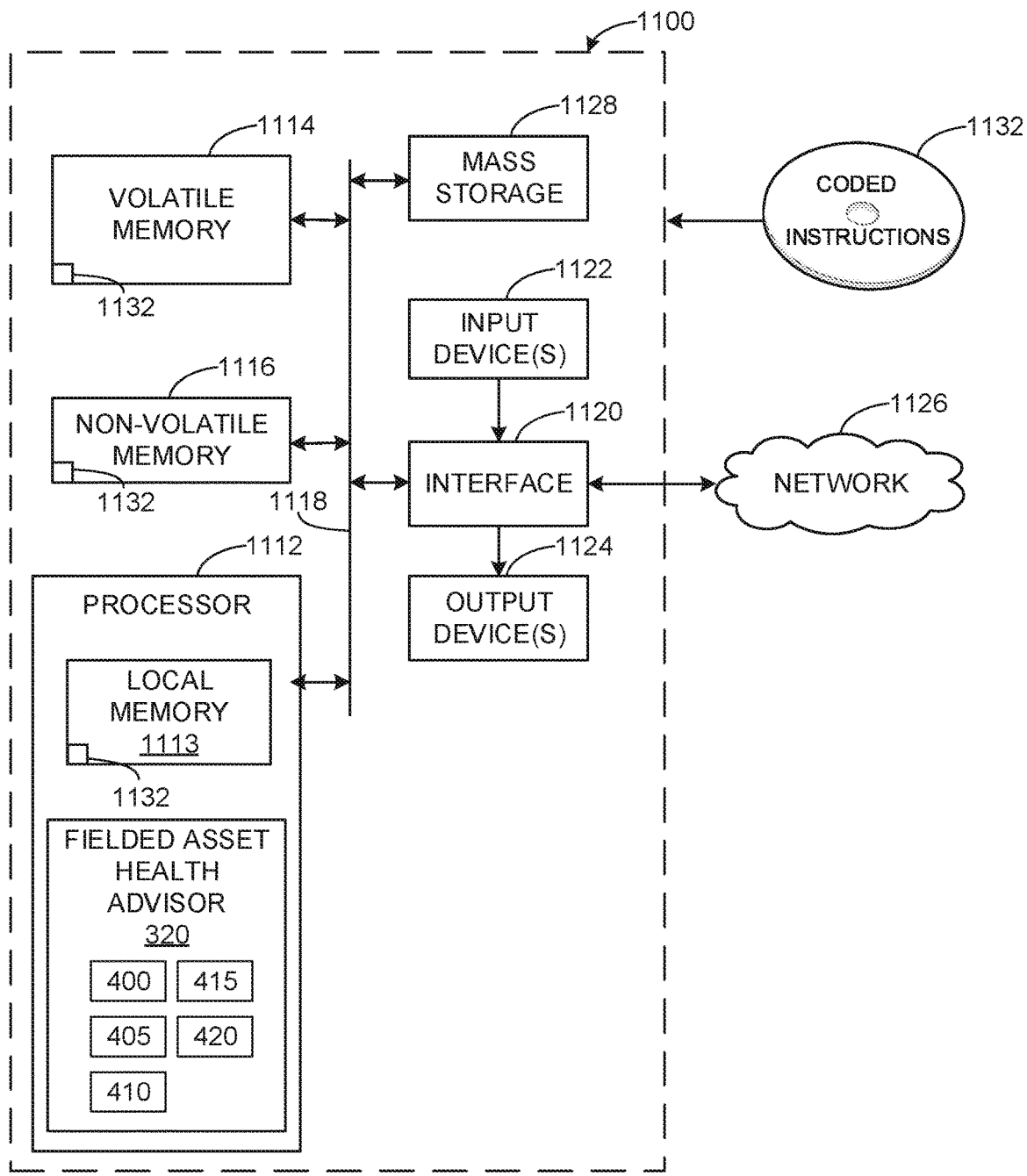
FIG. 11 is a block diagram of an example processing platform structured to execute machine-readable instructions to implement the methods of FIGS. 7-10 and/or the example fielded asset health advisor apparatus of FIGS. 3-5.

FIG. 11 is a block diagram of an example processor platform 1100 capable of executing the instructions of FIGS. 7-10 to implement the FAHA 320 of FIGS. 3-5. The processor platform 1100 can be, for example, a server, a personal computer, a mobile device (e.g., a cell phone, a smart phone, a tablet such as an iPad'), a personal digital assistant (PDA), or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. The hardware processor may be a semiconductor based (e.g., silicon based) device. In this example, the processor 1112 implements the example data collection engine 400, the example parameter tracker 405, the example health quantifier calculator 410, the example recommendation generator 415, and the report generator 420 of FIG. 4.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a peripheral component interconnect (PCI) express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip, and/or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and DVD drives.

The coded instructions 1132 of FIGS. 7-10 may be stored in the mass storage device 1128, in the volatile memory 1114, in the non-volatile memory 1116, and/or on a removable non-transitory computer readable storage medium such as a CD or DVD.

From the foregoing, it will be appreciated that example methods, apparatus, systems, and articles of manufacture have been disclosed that perform prognostic health monitoring of a turbine engine. Prior methods of performing prognostic health monitoring of a turbine engine were limited due to a lack of visibility for asset related information. Prior methods were unable to determine with a relative level of accuracy when to remove a turbine engine from service due to an inability to incorporate different facets of asset management into calculating asset health quantifiers. As a result, prior methods removed turbine engines from service either based on rudimentary time schedules, cycle counts, or based on inspection results prior to an aircraft flight, where the latter generated increased inconvenience and expense to an aircraft operator. Further, aircraft passengers can be inconvenienced when turbine engines are abruptly removed from service due to results from an inspection prior to a flight.

The above-disclosed fielded asset health advisor apparatus estimates current health states (e.g., actual AHQ, etc.) and forecasts projected health states (e.g., projected AHQ, etc.) of an asset such as a turbine engine by component and sub-component of the asset while in service with limited instrumentation using one or more models such as a digital twin model of the turbine engine. The example fielded asset health advisor apparatus can estimate the current health states and forecast the projected health states with improved accuracy by utilizing a tracking filter.

The example fielded asset health advisor apparatus can use the tracking filter to compare asset sensor data obtained from a turbine engine sensor to simulated asset data generated by the digital twin model. The example fielded asset health advisor apparatus can use the tracking filter to generate calibrated simulated sensor data based on the comparison. The example fielded asset health advisor apparatus can optimize and/or otherwise improve the digital twin model by updating one or more parameters of the digital twin model based on the calibrated simulated sensor data to generate simulated sensor data with improved accuracy compared to the sensor data obtained by the turbine engine sensor. The example fielded asset health advisor apparatus can optimize and/or otherwise improve a time on-wing or a time in operation of the asset while minimizing cost and removal time and while yet achieving a post-repair mission based on forecast utilization information for the asset by calculating asset health quantifiers based on improved accuracy of the digital twin model.

The example fielded asset health advisor apparatus can obtain asset monitoring information corresponding to a turbine engine on-wing of an aircraft while in service. The example fielded asset health advisor apparatus can generate (e.g., iteratively generate) an actual health state of the turbine engine based on generating actual health states of individual components of the turbine engine using one or more computer-generated models corresponding to the turbine engine based on calibrated simulated sensor data. The example fielded asset health advisor apparatus can generate a report including workscope recommendations that identify that the turbine engine is a candidate for removal from service to perform maintenance on one or more components of the turbine engine based on a comparison of one or more of the actual health states to an actual health state threshold. A turbine engine maintenance provider can remove the turbine engine off-wing or from service based on the report, perform the maintenance operation on the removed turbine engine, and re-deploy the turbine engine back to service where the example fielded asset health advisor apparatus can resume monitoring the turbine engine while in service. Alternatively, the example fielded asset health advisor apparatus can determine if the turbine engine should remain on-wing or in service.

Although certain example methods, apparatus, systems, and articles of manufacture have been disclosed herein, the scope of coverage of this patent is not limited thereto. On the contrary, this patent covers all methods, apparatus, systems, and articles of manufacture fairly falling within the scope of the claims of this patent.

What is claimed is:

1. An apparatus comprising:
a health quantifier calculator to execute a plurality of computer-generated models to generate first sensor data of a turbine engine, the first sensor data based on simulating a sensor monitoring the turbine engine using asset monitoring information, and the plurality of computer-generated models including a historical data model, a physics-based model, a stochastic model, and a hybrid model;
a parameter tracker to (i) obtain physical sensor-based asset sensor data matched to an engine model using the first sensor data and a second sensor data, the second sensor data based on obtaining sensor data from a sensor monitoring the turbine engine and (ii) generate third sensor data corresponding to the turbine engine;
wherein, the third sensor data is based on (i) previous performance of one or more similar assets, (ii) extrapolating data from the physics-based model, (iii) generating random variation based on fluctuations generated by the historical data model, and (iv) comparing one of the plurality of models to another of the plurality of models;
the health quantifier calculator to execute the computer-generated model using the third sensor data to generate an asset health quantifier of the turbine engine; and
a recommendation generator to generate a workscope recommendation to improve an operation of the turbine engine when the asset health quantifier satisfies a threshold.

2. The apparatus of claim 1, wherein the health quantifier calculator is to determine the asset health quantifier by:
capturing a first image of the turbine engine using an imaging system;
comparing the first image to a second image in a database using an object-recognition system; and
determining the asset health quantifier when the first image matches the second image.

3. The apparatus of claim 1, wherein the physics-based model corresponds to a digital twin model of the turbine engine.

4. The apparatus of claim 1, wherein simulating the sensor includes simulating at least one of a chip detector sensor, a dust sensor, a flow sensor, a position sensor, a pressure sensor, a speed sensor, a temperature sensor, or a vibration sensor.

5. The apparatus of claim 1, wherein at least one of:
the first and the second sensor data are based on the steady-state information, the steady-state information corresponding to the turbine engine operating in a steady-state flight segment; or
the first and the second sensor data are based on the transient information, the transient information corresponding to the turbine engine operating in a transition between steady-state flight segments.

6. A method comprising:

executing a plurality of computer-generated models to generate first sensor data of an asset, the first sensor data based on simulating a sensor monitoring the asset using asset monitoring information, and the plurality of computer-generated models including a historical data model, a physics-based model, a stochastic model, and a hybrid model;

obtaining physical sensor-based asset sensor data matched to an engine model using the first sensor data and second sensor data to generate third sensor data corresponding to the asset, the second sensor data based on obtaining sensor data from a sensor monitoring the asset;

wherein, the third sensor data is based on (i) previous performance of one or more similar assets, (ii) extrapolating data from the physics-based model, (iii) generating random variation based on fluctuations generated by the historical data model, and (iv) comparing one of the plurality of models to another of the plurality of models;

executing the computer-generated model using the third sensor data to generate an asset health quantifier of the asset; and in response to the asset health quantifier satisfying a threshold, generating a workscope recommendation to improve an operation of the asset.

7. The method of claim 6, wherein generating the asset health quantifier includes:

capturing a first image of the asset using an imaging system; comparing the first image to a second image in a database using an object-recognition system; and determining the asset health quantifier when the first image matches the second image.

8. The method of claim 6, wherein the physics-based model corresponds to a digital twin model of the asset.

9. The method of claim 6, wherein simulating the sensor includes simulating at least one of a chip detector sensor, a dust sensor, a flow sensor, a position sensor, a pressure sensor, a speed sensor, a temperature sensor, or a vibration sensor.

10. The method of claim 6, wherein at least one of:

the first and the second sensor data are based on the steady-state information, the steady-state information corresponding to the asset operating in a steady-state flight segment; or the first and the second sensor data are based on the transient information, the transient information corresponding to the asset operating in a transition between steady-state flight segments.

11. A non-transitory computer readable storage medium comprising instructions which when executed, cause a machine to at least:

execute a plurality of computer-generated models to generate first sensor data of an asset, the first sensor data based on simulating a sensor monitoring the asset using asset monitoring information, and the plurality of computer-generated models including a historical data model, a physics-based model, a stochastic model, and a hybrid model;

obtain physical sensor-based asset sensor data matched to an engine model using the first sensor data and second sensor data to generate third sensor data corresponding to the asset, the second sensor data based on obtaining sensor data from a sensor monitoring the asset;

wherein, the third sensor data is based on (i) previous performance of one or more similar assets, (ii) extrapolating data from the physics-based model, (iii) generating random variation based on fluctuations generated by the historical data model, and (iv) comparing one of the plurality of models to another of the plurality of models;

execute the computer-generated model using the third sensor data to generate an asset health quantifier of the asset; and generate a workscope recommendation to improve an operation of the asset when the asset health quantifier satisfies a threshold.

12. The non-transitory computer readable storage medium of claim 11, wherein generating the asset health quantifier includes:

capturing a first image of the asset using an imaging system; comparing the first image to a second image in a database using an object-recognition system; and determining the asset health quantifier when the first image matches the second image.

13. The non-transitory computer readable storage medium of claim 11, wherein the physics-based model corresponds to a digital twin model of the asset.

14. The non-transitory computer readable storage medium of claim 11, wherein simulating the sensor includes simulating at least one of a chip detector sensor, a dust sensor, a flow sensor, a position sensor, a pressure sensor, a speed sensor, a temperature sensor, or a vibration sensor.

15. The non-transitory computer readable storage medium of claim 11, wherein at least one of:

the first and the second sensor data are based on the steady-state information, the steady-state information corresponding to the asset operating in a steady-state flight segment; or the first and the second sensor data are based on the transient information, the transient information corresponding to the asset operating in a transition between steady-state flight segments.

* * * * *